US012809321B2

(12) United States Patent
Dosluoglu

(10) Patent No.: US 12,809,321 B2
(45) Date of Patent: Nov. 24, 2026

(54) SYSTEM AND METHOD FOR OPERATING AN ELECTRONIC DEVICE

(71) Applicant: 5G3I Ltd, London (GB)

(72) Inventor: Taner Dosluoglu, Glasgow (GB)

(73) Assignee: 5G3I Ltd, London (GB)

( * ) Notice: Subject to any disclaimer, the term of this patent is extended or adjusted under 35 U.S.C. 154(b) by 356 days.

(21) Appl. No.: 18/294,718

(22) PCT Filed: Jul. 28, 2022

(86) PCT No.: PCT/GB2022/051992
§ 371 (c)(1),
(2) Date: Feb. 2, 2024

(87) PCT Pub. No.: WO2023/017241
PCT Pub. Date: Feb. 16, 2023

(65) Prior Publication Data

US 2024/0337989 A1 Oct. 10, 2024

Related U.S. Application Data

(60) Provisional application No. 63/343,183, filed on May 18, 2022.

(30) Foreign Application Priority Data

Aug. 12, 2021 (WO) ................ PCT/GB2021/052088

(51) Int. Cl.
*G06F 17/00* (2019.01)
*G05B 13/02* (2006.01)
(Continued)

(52) U.S. Cl.
CPC ......... *G05B 13/0265* (2013.01); *H02M 3/156* (2013.01); *H02M 7/53871* (2013.01)

(58) Field of Classification Search
CPC ...... G05B 13/0265; G05B 2219/33027; G05B 2219/39271; G05B 23/0283; G05B 13/027; H02M 3/156; H02M 7/53871
(Continued)

(56) References Cited

U.S. PATENT DOCUMENTS 5,268,835 A 12/1993 Miyagaki et al.
5,477,444 A 12/1995 Bhat et al.
(Continued)

FOREIGN PATENT DOCUMENTS

EP 3693798 A1 8/2020
WO WO-2018200845 A1 * 11/2018 ......... G05B 19/4155
(Continued)

OTHER PUBLICATIONS

Reliability Engineering and System Safety (Year: 2025).*
(Continued)

*Primary Examiner* — Ronnie M Mancho
(74) *Attorney, Agent, or Firm* — Bradley Arant Boult Cummings LLP

(57) ABSTRACT

A system and corresponding method for operating an electronic device are presented. The system includes a controller (210) and a first processor (220). The controller (210) generates a control signal for controlling the electronic device. The first processor (220) receives a plurality of parameters including an electrical parameter of the electronic device and at least one of a process parameter, a system parameter, and an environmental parameter. The first processor (220) executes an artificial intelligence algorithm to generate a correction signal to adjust the control signal based on the plurality of parameters.

28 Claims, 25 Drawing Sheets

(51) Int. Cl.
*H02M 3/156* (2006.01)
*H02M 7/5387* (2007.01)

(58) Field of Classification Search
USPC ........................................................... 700/47
See application file for complete search history.

(56) References Cited

U.S. PATENT DOCUMENTS

| | | | | |
|---|---|---|---|---|
| 6,078,843 | A | 6/2000 | Shavit | |
| 6,725,208 | B1 | 4/2004 | Hartman et al. | |
| 11,221,611 | B2 * | 1/2022 | Abbott | B23D 51/16 |
| 11,461,210 | B2 * | 10/2022 | Tiwari | G06F 11/3442 |
| 11,526,138 | B2 * | 12/2022 | Gervais | G06N 3/084 |
| 11,543,786 | B2 * | 1/2023 | Gervais | F24F 11/30 |
| 11,644,882 | B2 * | 5/2023 | Kuno | G06F 1/305 713/300 |
| 11,668,534 | B2 * | 6/2023 | Landreth | F28F 27/00 62/171 |
| 11,747,771 | B2 * | 9/2023 | Gervais | G06F 9/451 700/48 |
| 11,754,983 | B2 * | 9/2023 | Gervais | G05D 22/02 700/276 |
| 11,844,145 | B2 * | 12/2023 | Elshafie | H04L 25/0226 |
| 11,864,359 | B2 * | 1/2024 | Heydari | H05K 7/20836 |
| 11,880,173 | B2 * | 1/2024 | Dosluoglu | G05B 13/027 |
| 12,005,540 | B2 * | 6/2024 | Abbott | B23Q 15/12 |
| 12,111,621 | B2 * | 10/2024 | Abbott | G05B 13/027 |
| 12,124,226 | B2 * | 10/2024 | Abbott | G06N 3/092 |
| 12,140,917 | B2 * | 11/2024 | Gervais | G05B 13/029 |
| 2002/0095221 | A1 | 7/2002 | Cook et al. | |
| 2006/0006856 | A1 * | 1/2006 | Alexander | H02M 1/44 323/284 |
| 2007/0168058 | A1 | 7/2007 | Kephart et al. | |
| 2012/0117011 | A1 | 5/2012 | Hashimoto et al. | |
| 2015/0094850 | A1 | 4/2015 | Passot et al. | |
| 2016/0333855 | A1 | 11/2016 | Lund et al. | |
| 2017/0261949 | A1 | 9/2017 | Hoffmann et al. | |
| 2018/0204116 | A1 * | 7/2018 | Evans | G06N 3/045 |
| 2018/0235063 | A1 * | 8/2018 | Garcia Tormo | H02M 3/156 |
| 2018/0284703 | A1 | 10/2018 | Sonoda et al. | |
| 2019/0050729 | A1 | 2/2019 | Lakshmanan et al. | |
| 2019/0227528 | A1 * | 7/2019 | Abbott | G06N 20/00 |
| 2019/0286099 | A1 | 9/2019 | Satou et al. | |
| 2019/0310596 | A1 | 10/2019 | Hamburger | |
| 2019/0332918 | A1 | 10/2019 | Gómez Gutiérrez et al. | |
| 2020/0026246 | A1 | 1/2020 | Nakagawa | |
| 2020/0050178 | A1 * | 2/2020 | Gao | G06Q 10/0635 |
| 2020/0103878 | A1 | 4/2020 | SayyarRodsari et al. | |
| 2020/0240662 | A1 | 7/2020 | Picardi et al. | |
| 2020/0348628 | A1 | 11/2020 | Hoffmann et al. | |
| 2021/0240145 | A1 * | 8/2021 | Abbott | B23B 51/009 |
| 2021/0287072 | A1 * | 9/2021 | Evans | G06N 3/045 |
| 2021/0359577 | A1 | 11/2021 | Funk et al. | |
| 2022/0299946 | A1 * | 9/2022 | Abbott | G05B 13/027 |
| 2024/0337989 | A1 * | 10/2024 | Dosluoglu | G05B 13/027 |

FOREIGN PATENT DOCUMENTS

| | | | |
|---|---|---|---|
| WO | WO-2018217903 | A1 | 11/2018 |
| WO | WO-2021155156 | A1 | 8/2021 |
| WO | WO-2022038338 | A1 | 2/2022 |
| WO | WO-2023017241 | A1 | 2/2023 |

OTHER PUBLICATIONS

Relaibility Engineering an safety_Data driven fault detection and diagnosis in industrial process systems (Year: 2025).*

Dosluoglu, Taner, U.S. Appl. No. 63/343,183, "System and Method for Operating an Electronic Device," filed on May 18, 2022, 80 pages.

Patent Cooperation Treaty, International Application No. PCT/GB2021/052088, "International Preliminary Report on Patentability," Jul. 25, 2022; 7 pages.

Patent Cooperation Treaty, International Application No. PCT/GB2021/052088, "International Search Report," Nov. 24, 2021; 4 pages.

Patent Cooperation Treaty, International Application No. PCT/GB2021/052088, "Written Opinion of the International Searching Authority," Nov. 24, 2021; 5 pages.

Patent Cooperation Treaty, International Application No. PCT/GB2022/051992, "International Preliminary Report on Patentability," Nov. 29, 2023, 18 pages.

Patent Cooperation Treaty, International Application No. PCT/GB2022/051992, "International Search Report," Dec. 6, 2022, 5 pages.

Patent Cooperation Treaty, International Application No. PCT/GB2022/051992, "Written Opinion of the International Preliminary Examining Authority," Jun. 28, 2023, 14 pages.

Patent Cooperation Treaty, International Application No. PCT/GB2022/051992, "Written Opinion of the International Searching Authority," Dec. 6, 2022, 11 pages.

Uspto, U.S. Appl. No. 17/924,766, "Notice of Allowance," dated Aug. 31, 2023, 15 pages.

Uspto, U.S. Appl. No. 17/924,766, "Notice of Allowance," dated Oct. 24, 2023, 13 pages.

* cited by examiner

Use of iterative techniques for solving inverse transfer function

1400

| PHASE | Ultra-Edge device | Digital Shadow |
|---|---|---|
| DESIGN | | Capture AI constructs for the entire operating system for the product family |
| DEVELOP<br>VALIDATE | | Select the AI constructs based on the specific product data (process and test) for system integration |
| OPTIMIZE | | Virtual System integration of the specific product, optimization and selection of AI constructs |
| DEPLOY<br>SCALE | Self-calibration (including calibration with component values if applicable) and continued monitoring of the environmental parameters | |
| DEPLOY<br>SCALE | Detect anomalies with environmental parameters | Update digital shadow when new combination is identified based on the data from ultra-edge device |
| DEPLOY<br>SCALE | Reconfigured as required by system constraints | Select new subset of AI constructs based on system optimization or new targets determined by a system level application |
| DEPLOY<br>SCALE | Reconfigured as required by the state of product within its own lifecycle and its operating environment | Match the information from ultra-edge device to the product lifecycle data and determine the appropriate set of AI constructs based on the product status and its operating environment |
| RECYCLE | End-of-life configuration until scheduled maintenance and decommission | Start design phase for new product development |

Figure 15B

Use of System Instructions for improving the closed-loop response

| System Inst. Sets | $F1_{error}$ |
|---|---|
| AACX | 2 |
| AGCX | 1 |
| ACXB | 0 |
| GCXD | 0 |
| … | 0 |
| BDCX | 0 |
| DCXC | 0 |

The instruction embedding is obtained from multiple instances and weighted with the corresponding $f1_{error}$ values for the occurrence and position information of the corresponding instruction into a vector data.

SYSTEM AND METHOD FOR OPERATING AN ELECTRONIC DEVICE

This application is related to PCT/GB2021/052088 (published as WO2022/038338), which is herein incorporated by reference in its entirety.

TECHNICAL FIELD

The present disclosure relates to a system and corresponding method for operating an electronic device.

BACKGROUND

Electronic devices such as power converters among others may be designed for various applications and different operating modes. Over time the operation of the electronic device may be altered by aging of the components and various anomalies or external factors, hence reducing the efficiency of the device or preventing its use altogether. There is therefore a need for an improved method for controlling an electronic device.

It is an object of the disclosure to address one or more of the above mentioned limitations.

SUMMARY

According to a first aspect of the disclosure there is provided a method for operating an electronic device, the method comprising

- generating a control signal for controlling the electronic device;
- receiving a plurality of parameters comprising an electrical parameter of the electronic device and at least one of a process parameter, a system parameter, and an environmental parameter and
- executing an artificial intelligence algorithm configured to generate a correction signal to adjust the control signal based on the plurality of parameters.

Optionally, the method comprises defining a plurality of modes of operation of the electronic device, wherein each mode is associated with a set of data; and detecting a first set of data associated with a current operation of the device; wherein the artificial intelligence algorithm is further configured to determine using the first set of data if the electronic device operates in a known mode of operation or in an unknown mode of operation.

For instance the set of data may comprise process corner parameters, device configuration parameters, operating environment parameters, real-time control-data, test data, controller output, among others.

Optionally, wherein when the device is operating in a known mode, the correction signal is configured to adjust the control signal for the identified known mode; and when the device is operating in an unknown mode the correction signal is configured to adjust the control signal for a predetermined default mode.

Optionally, the method comprises running a model of the electronic device to determine if the electronic device is operating in a target mode; and when the electronic device is not operating in the target mode sending a second set of data associated with the target mode to the artificial intelligence algorithm.

For instance the second set of data may include configuration data and a parameter data.

Optionally, the method comprises analysing the first set of data to classify the unknown mode.

Optionally, the model comprises a functional model and a set of modes of operation among the plurality of modes of operation.

Optionally, the method comprises using a digital twin of the electronic device to find an optimum configuration and mode of operation of the electronic device and to update the functional model.

Optionally, wherein the electronic device is characterised by an ideal response, the method comprising generating training data and training the artificial intelligence algorithm using the training data to generate a correction signal that reduces a deviation from the ideal response.

Optionally, wherein the training data are generated using a transfer function of the electronic device. For instance a target function may be used to generate an error function.

Optionally, the method comprises generating a construct for each mode of operation. For instance each construct may be generated for the specific process and test data of the device.

Optionally, wherein the construct comprises a multidimensional vector in a multidimensional vector space.

Optionally, wherein the multidimensional vector space comprises an entire operating region of the electronic device and wherein a mode of operation is identified using supervised learning as one or more clusters of constructs.

Optionally, the method comprises identifying a new mode of operation using unsupervised learning. For example identifying a new mode of operation may be performed using Monte Carlo analysis.

Optionally, the method comprises determining a current mode of operation of the device within the entire operating region and adjusting the electronic device configuration based on the current mode of operation.

Optionally, wherein electronic device configuration is adjusted based on the current mode of operation throughout the lifecycle of the device. For example the product life cycle of the device comprises a design phase, an optimization phase and a recycling phase.

Optionally, the method comprises sending the adjusted configuration to a digital twin through the lifecycle of the device to perform at least one of optimization, and predictive maintenance of the device.

Optionally, the method comprises analysing the unknown mode to predict a failure of the electronic device or when the device configuration needs to be adjusted to improve performance.

Optionally, wherein the electronic device is part of a system, the method further comprising analysing system instructions to identify a correlation between a set of instructions and an event.

Optionally, wherein the event comprises the correction signal.

Optionally, the method further comprises predicting a behaviour of the device based on the correlation. For example the behaviour may be a chaotic behaviour. For instance the chaotic behaviour may be triggered by a cyber-attack.

According to a second aspect of the disclosure, there is provided a system for operating an electronic device, the system comprising a controller configured to generate a control signal for controlling the electronic device; and a first processor adapted to receive a plurality of parameters comprising an electrical parameter of the electronic device and at least one of a process parameter, a system parameter, and an environmental parameter and to execute an artificial intelligence algorithm configured to generate a correction signal to adjust the control signal based on the plurality of parameters.

Optionally, the system comprises a second processor configured to define a plurality of modes of operation of the electronic device, wherein each mode is associated with a set of data; and to detect a first set of data associated with a current operation of the device; wherein the artificial intelligence algorithm is further configured to determine using the first set of data if the electronic device operates in a known mode of operation or in an unknown mode of operation.

Optionally, the system comprises the electronic device and a sensor for sensing the electrical parameter of the electronic device.

Optionally, the system comprises a communication interface for communicating with a digital twin of the electronic device.

Optionally, the system comprises a first software engine configured to define the plurality of modes of operation of the electronic device, a second software engine configured to run a model of the electronic device to determine if the electronic device is operating in a target mode; and a third software engine configured to send a second set of data associated with the target mode to the artificial intelligence algorithm when the electronic device is not operating in the target mode.

Optionally, the system comprises a combiner for combining the control signal with the correction signal and a synchronization circuit configured to synchronize the control signal with the correction signal.

Optionally, the electronic device comprises a switched mode power supply, or a driver for driving a motor, or an active power filter, or an inverter. For instance the driver for driving a motor may be a switching controller.

Optionally, the electronic device is part of a power system. For instance the power system may be an energy grid.

The options described with respect to the first aspect of the disclosure are also common to the second aspect of the disclosure.

According to a third aspect of the disclosure there is provided a non-transitory computer readable data carrier having stored thereon instruction which when executed by a computer cause the computer to carry out the method according to the first aspect of the disclosure.

DESCRIPTION OF THE DRAWINGS

The disclosure is described in further detail below by way of example and with reference to the accompanying drawings, in which:

FIG. 15B is a table showing a flow for setting the parameters of the ultra-edge device;

DESCRIPTION

Figure 1:
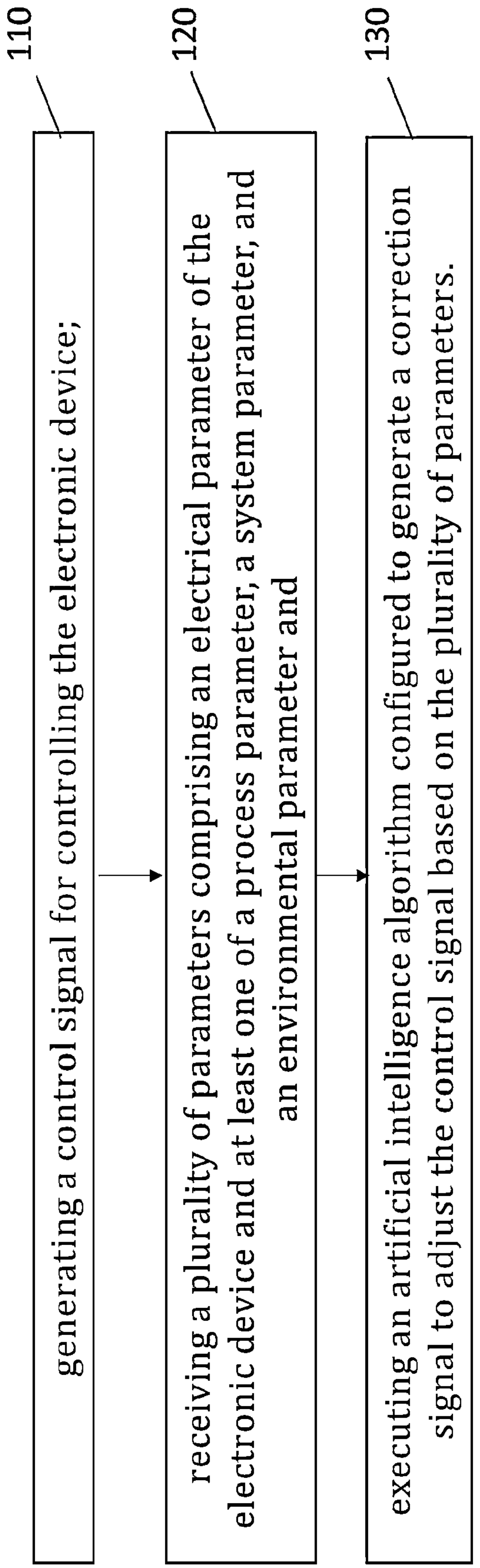
FIG. 1 is a is a flow chart of a method for operating an electronic device according to the disclosure.

FIG. 1 is a flow chart of a method for operating an electronic device according to the disclosure.

At step 110 a control signal for controlling the electronic device is generated.

At step 120 a plurality of parameters are received. The parameters include an electrical parameter of the electronic device and at least one of a process parameter, a system parameter, and an environmental parameter.

At step 130 an artificial intelligence (AI) algorithm is executed. The AI algorithm is configured to generate a correction signal to adjust the control signal based on the plurality of parameters.

Figure 2:
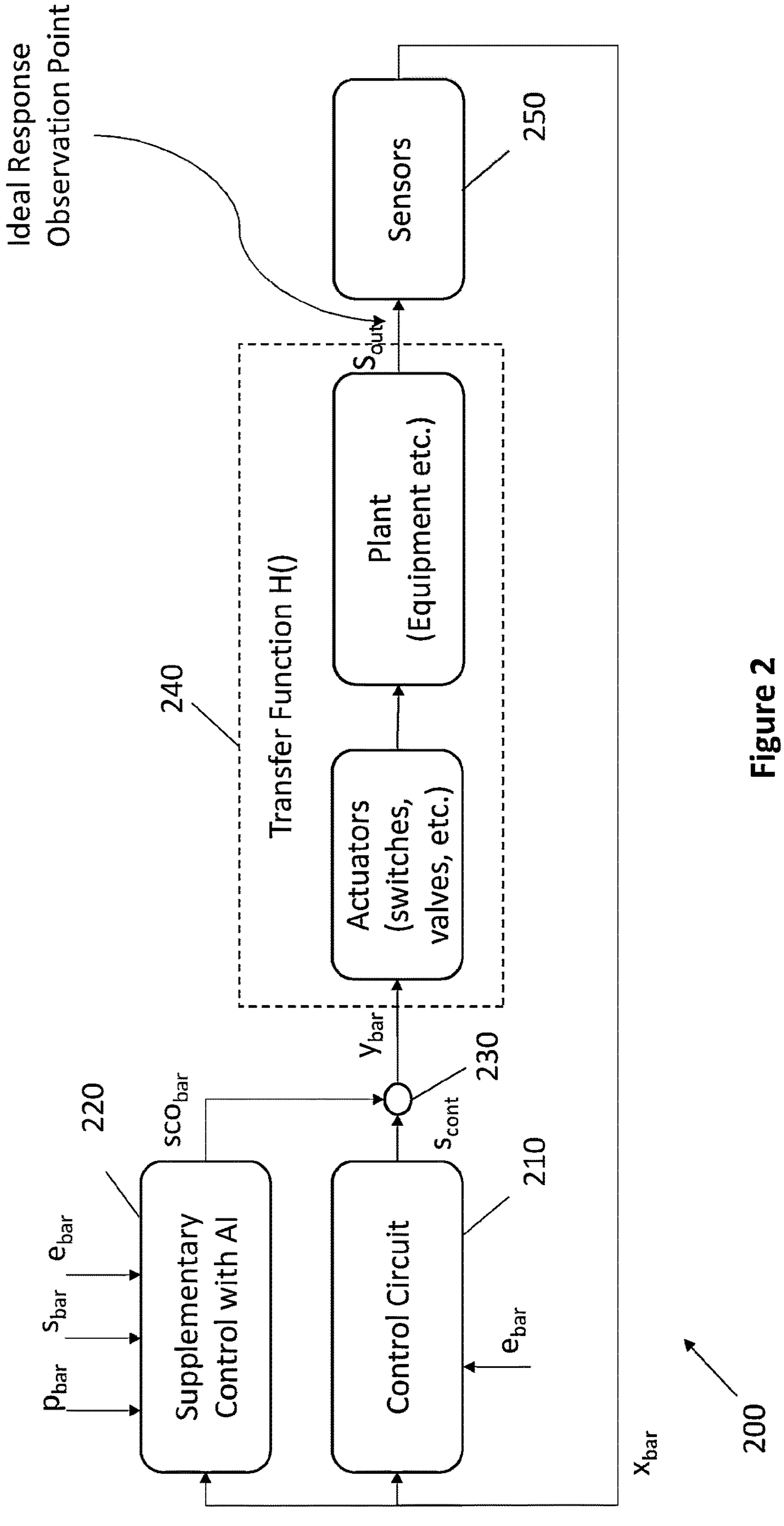
FIG. 2 is a is a diagram of a system for operating and electronic device according to the method of FIG. 1.

FIG. 2 is a diagram of a system for operating and electronic device according to the method of FIG. 1. The system 200 includes a first controller 210, a second controller 220, an adder 230, an electronic device 240 and one or more sensors 250. The first controller 210 is also referred to as main or primary controller.

The electronic device 240 has a transfer function H which may be derived from the real system or may be modelled. The system 200 may be used in a variety of applications. For instance the system 200 may be used for operating a power converter such as a switched mode power converter. In the case of a power converter the transfer function H may be defined as the ratio Vout/Vin of the converter output voltage over its input voltage and the first controller 210 may include a controller for controlling the switching operation of the power switches of the converter.

It will be appreciated that the actuators and sensors shown in the diagram 200 can be integrated within a same integrated circuit or can be provided externally.

The electronic device 240 may be represented by a set of actuators and a plant. Actuators are considered part of the control system and they are typically part of the design (switches of the power supply, valves etc). The combined response of the controller and actuators are determined during the design phase. The plant is typically unknown during the design phase except as specification requirements of all possible plants that might be used. For a power controller, the transistor switches are the actuators (in most cases they are integrated within the devices). The plant includes the inductors, capacitors, and the SoC device (processor) that is being powered by the power converter.

The second controller 220 may be a processor configured to execute an artificial intelligence AI algorithm. The second controller is also referred to as artificial intelligence (AI) controller or supplementary AI controller. The artificial intelligence algorithm may be implemented in different ways. For instance the artificial intelligence algorithm used in supplementary controller may include one or more machine learning (ML) algorithms. The ML algorithm(s) might combine linear regression, and classification with multiple neural networks. The ML algorithm may also combine supervised and unsupervised learning. Predetermined pattern recognition may be generated by supervised learning during the design phase of the device.

The second controller 220 is configured to receive multiple inputs including: process parameters Pbar, system parameters Sbar, environmental parameters ebar; as well as the sensor measurement(s) Xbar from the one or more sensors 250. The second controller 220 has an output for providing a supplementary control signal SCObar, also referred to as correction signal.

The process parameters Pbar are known, hence predetermined. They may include process corner and test parameters vector as well as deviations between devices due to manufacturing etc.

The system parameters Sbar may include various system configuration parameters including a sequence of instructions recognized as patterns. For instance a set of instructions provided to a processor that is powered by the controller of a switching converter. In another example set of instructions may be provided to the controller of a robotic arm. The instruction set refers to the plant and can be used to anticipate changes in the plant transfer function, and to adjust the controller accordingly. The Controller output is correlated to the plant instructions such that a required controller's response may be anticipated for corresponding plant transfer function transients that might otherwise be outside the response of the controller (e.g. fast load transients due to processor instructions).

The environmental parameter(s) ebar may include different parameters including temperature, humidity etc . . . .

The sensor measurements Xbar may vary depending on the application and could be any measurable quantity. When the electronic device is a power converter the parameter Xbar may be an inductor current measured by a current sensor. The sensor measurement Xbar is used to train the AI algorithm of the second controller 220 together with process parameters, system parameters, environmental parameters, and the control error correction signal SCObar.

The first controller 210 is adapted to receive the sensor measurement(s) Xbar, and the environmental parameter(s) ebar, and to provide a primary control signal Scont.

In operation the adder 230 receives the primary control signal Scont from the first controller 210 and the supplementary control signal SCObar from the second controller 220 and generates a combined control signal Ybar. The combined control signal Ybar is provided to the electronic device 240 so that the electronic device outputs an ideal response Sout. The supplementary control signal SCObar is used to respond to any deviation of the electronic device from the ideal response.

The AI algorithm may be trained to respond to any deviation of the electronic device from its ideal response. For instance a set of input output values may be used to train the AI, in which each pair has an input value and a corresponding ideal output value for the input value.

Figure 3A:
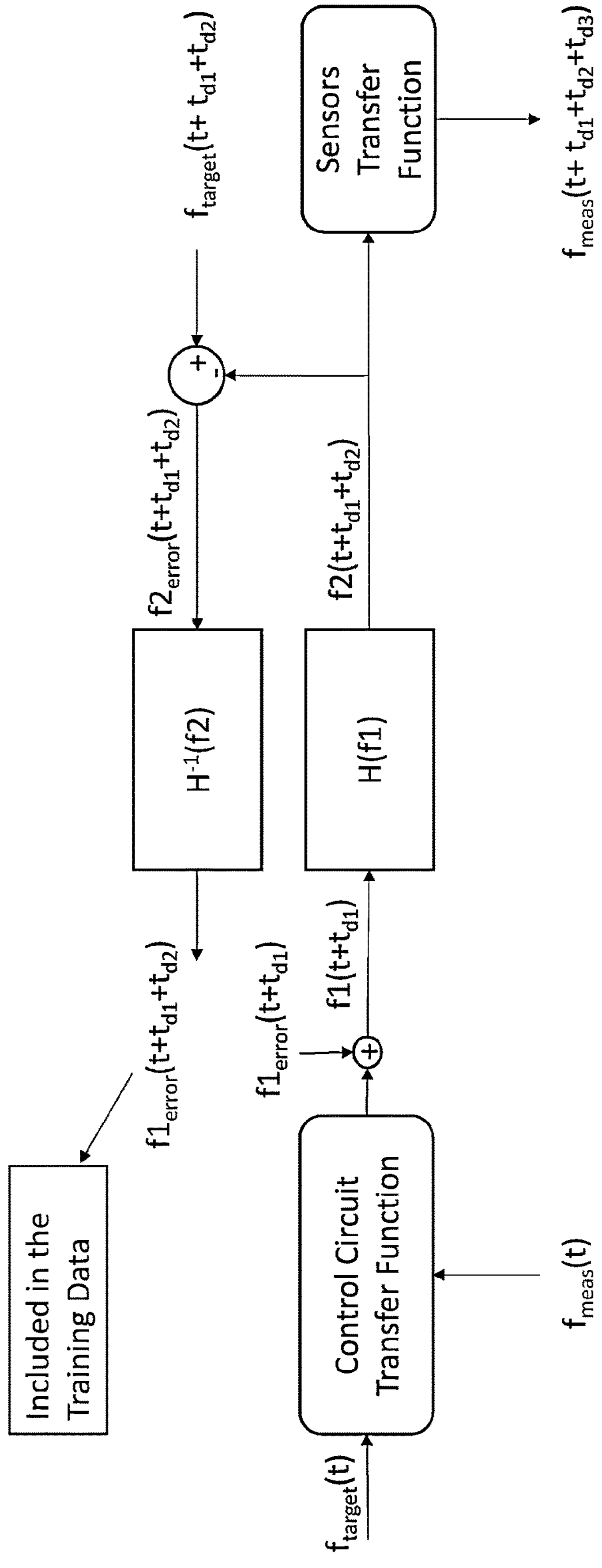
FIG. 3A is a diagram illustrating a method for training the AI algorithm.

FIG. 3A illustrates an exemplary method for training the AI algorithm. The training data for the AI algorithm are obtained as outlined below. The actuator and plant system response is represented as the transfer function H(f). The inverse transfer function $H^{-1}$ is used for obtaining a desired input f1 from an output f2. In this example the ideal response $f_{target}$ is compared with the simulated/actual output f2 and the error f2error ($F_{target}$−f2) is transferred as training data by using the inverse transfer function $H^{-1}$ (f2). For these simulations the time delay in each block is also considered.

The first controller 110 is designed with system level constraints and has a known error at its output as well as a measurement error, noise in the system, and other operating conditions and device level process variations (for instance based on optimization of system level constraints such as power, cost etc.). The inputs of the first controller 110 include target values or target response $f_{target}$ and measurements $f_{meas}$ which can be from both internal circuits and external sensors.

The AI algorithm uses control circuit inputs $f_{target}$ and $f_{meas}$ described as input training dataset. The AI algorithm may also use other parameters such as the parameters $p_{bar}$, $s_{bar}$, $e_{bar}$ described above and estimated component values vector (power supply, component values etc.).

The output training dataset $f_{train\_data}$ is obtained from error function of the system when it is above a threshold as given below:

$$f_{train_{data}} = 0, \quad \text{if } H^{-1}(f2_{error}) < \text{threshold}$$

$$f_{train_{data}} = H^{-1}(f2_{error}), \quad \text{if } H^{-1}(f2_{error}) \geq \text{threshold}$$

The training data are used for two different purposes. The first aim is to identify and classify the system state and operating environment. This can be supervised training where the predefined use cases, failure modes, process corners, and system configurations are captured. It can also be unsupervised training where a uniquely identified mode is captured that yields non-zero $f_{train\_data}$ that does not fall into one of the previously identified classifications. There might also be some classifications where $f_{train\_data}$ is always zero and specifically identified to force the output of the AI algorithm to zero.

For each classified system state, a neural network (with corresponding weights and biases) can be generated for inferencing at the device level. The inference parameters derived in this manner can be active when the system state is identified and operate in real-time within the control loop, hence allowing efficient implementation. The main consideration for inferencing within the control loop is avoidance of false positive outputs for a given system state. This includes extensive simulation coverage for inferencing when the system state is identified falsely or due to potential failure modes that have not yet been identified by the system.

Figure 3B:
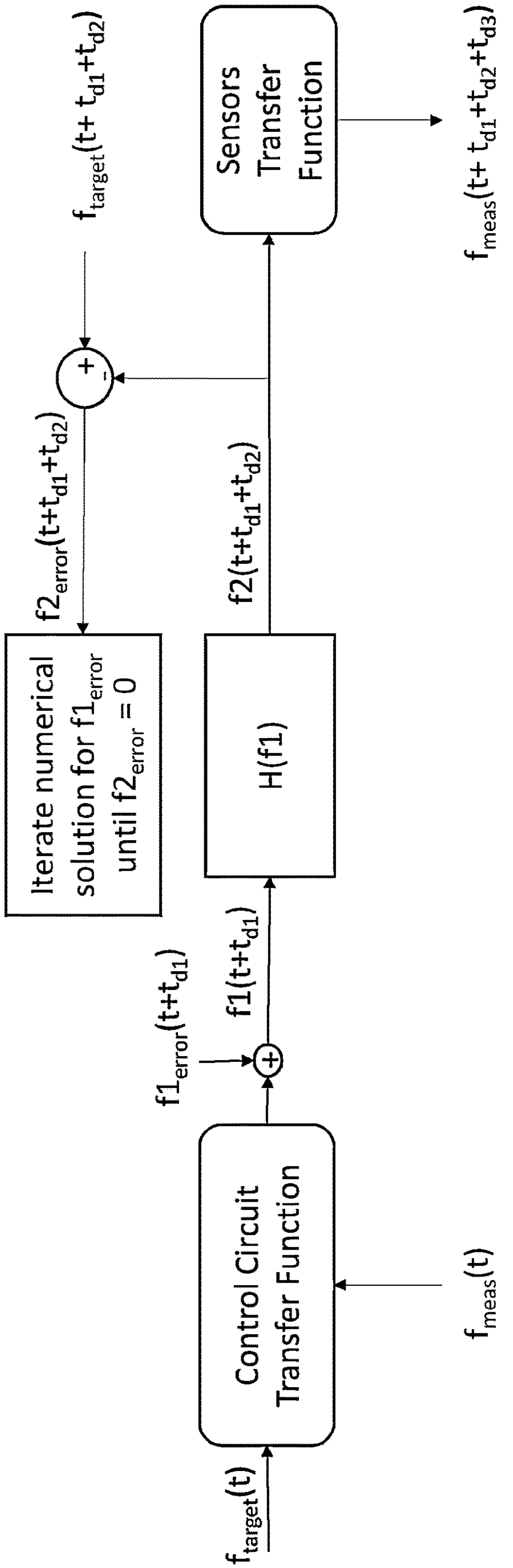
FIG. 3B is a diagram of a method for obtaining the inverse transfer function by iterative techniques.

FIG. 3B illustrates a method for obtaining the inverse transfer function by iterative techniques when the mathematical inverse transfer function cannot be easily obtained. The simulation for fixed period corresponding to the time period of inference application can be iterated for numerical solution of $f1_{error}$ that yields the desired target response. In this case the training data set for supplementary AI is formed of the $f1_{error}$ obtained numerically and combined with the input parameters (system, process, operating parameters etc).

Figure 4:
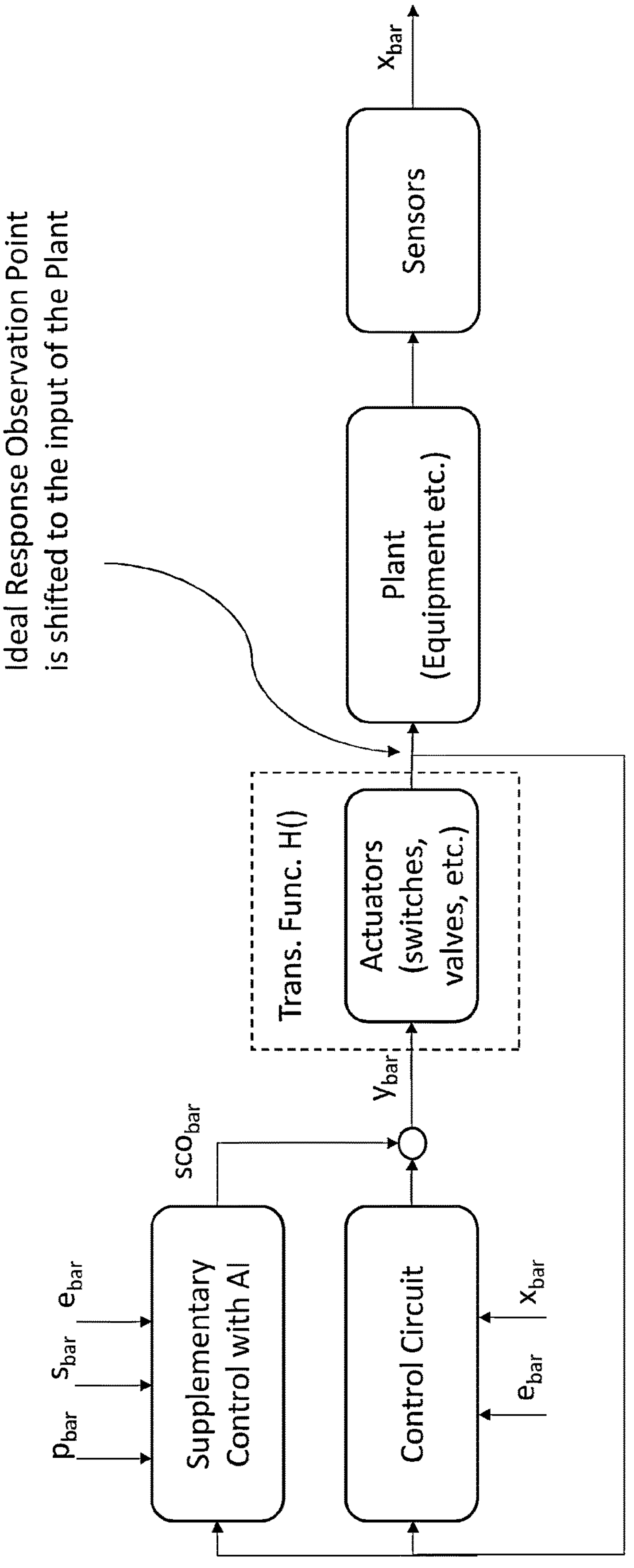
FIG. 4 is a is a diagram illustrating another method for training the AI algorithm.

FIG. 4 illustrates another method for training the AI algorithm for the cases in which the plant transfer function is not accessible. In this example the plant system response transfer function is not accessible. The sensor measurements are available as independent measurement/parameters. During operation the measurements are used by both the first controller 210 and the supplementary AI controller 220. They are also used to perform training in addition to the other signals such as f1error described in FIG. 3A.

Figure 5:
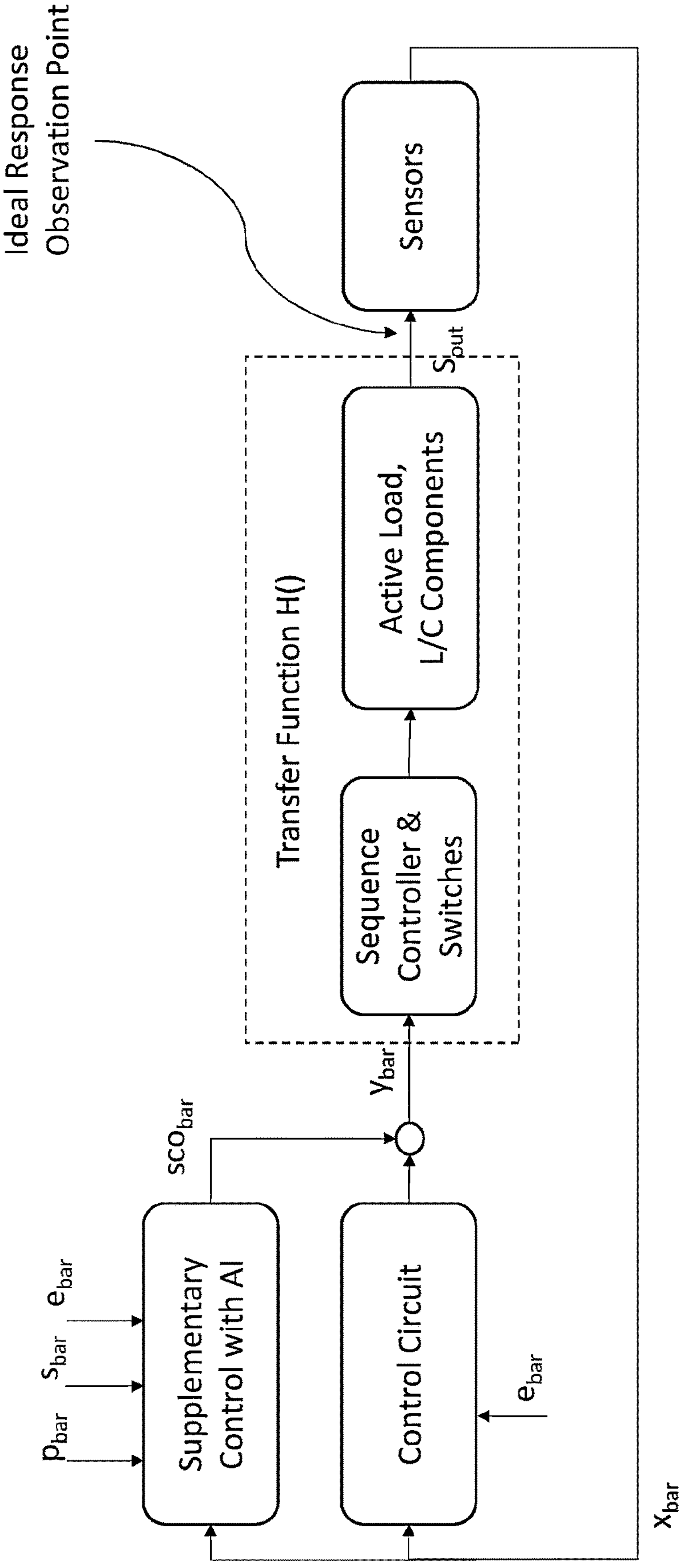
FIG. 5 is a diagram of a system for operating a switched mode power converter.

FIG. 5 is a diagram of a system for operating a switched mode power converter such as a DC-DC switching regulator. In this example the system response Sout is the output voltage Vout of the switching regulator and the combined control signal Ybar is the duty cycle of the switching regulator.

The combined control signal Ybar is received as the input for the digital sequence controller. The output voltage is the plant output, indicated as the function $f_2$ in FIG. 2. The training data set is generated from the duty_cycle error ($f1_{error}$) and other system parameters including measured voltages, currents, component values, and various operating parameters.

Figure 6:
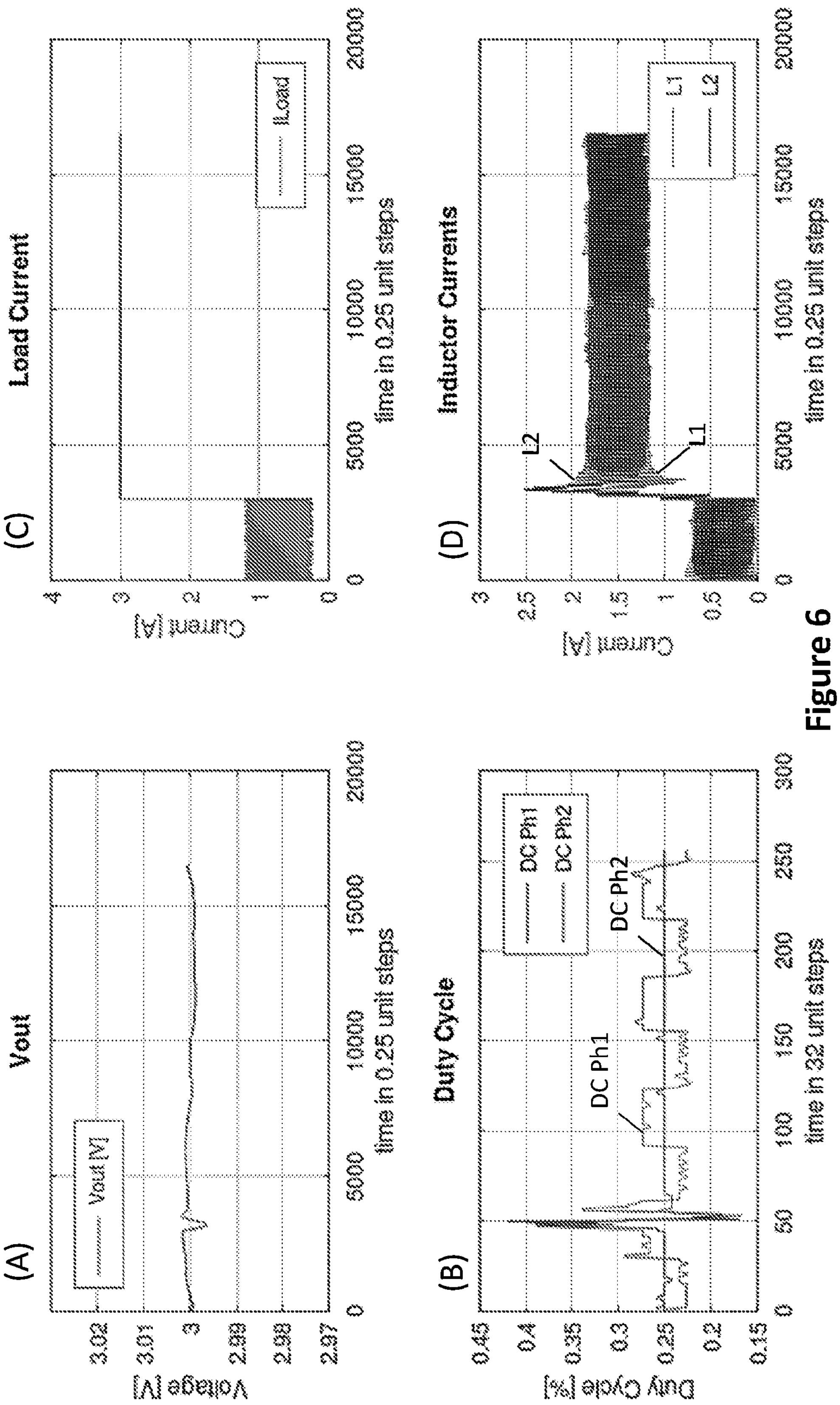
FIG. 6 is a simulation showing (A) the output voltage Vout, (B) the duty cycle, (C) the load current and (D) the inductor currents of a DC-DC switching regulator in an ideal case.

FIG. 6 is a simulation showing (A) the output voltage Vout, (B) the duty cycle, (C) the load current and (D) the inductor currents of a DC-DC switching regulator in an ideal case. The duty cycle corresponds to the function f1 and the output voltage to the function f2 in FIG. 2.

Figure 7:
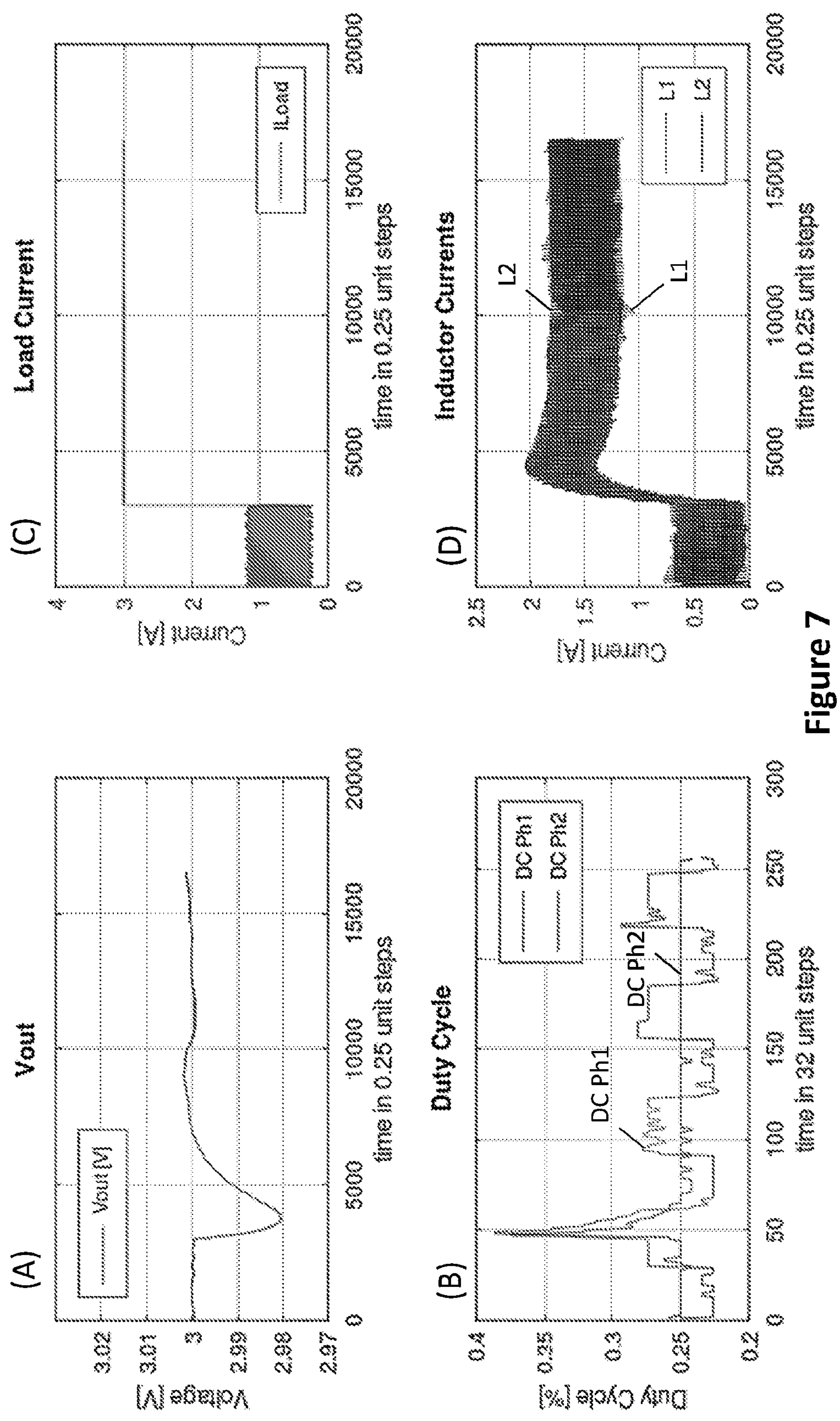
FIG. 7 is a simulation showing (A) the output voltage Vout, (B) the duty cycle, (C) the load current and (D) the inductor currents of a DC-DC switching regulator in an non-ideal case.

FIG. 7 is a simulation showing (A) the output voltage Vout, (B) the duty cycle, (C) the load current and (D) the inductor currents of a DC-DC switching regulator in an non-ideal case. The duty cycle corresponds to the function f1 and the output voltage to the function f2 in FIG. 2.

Figure 8:
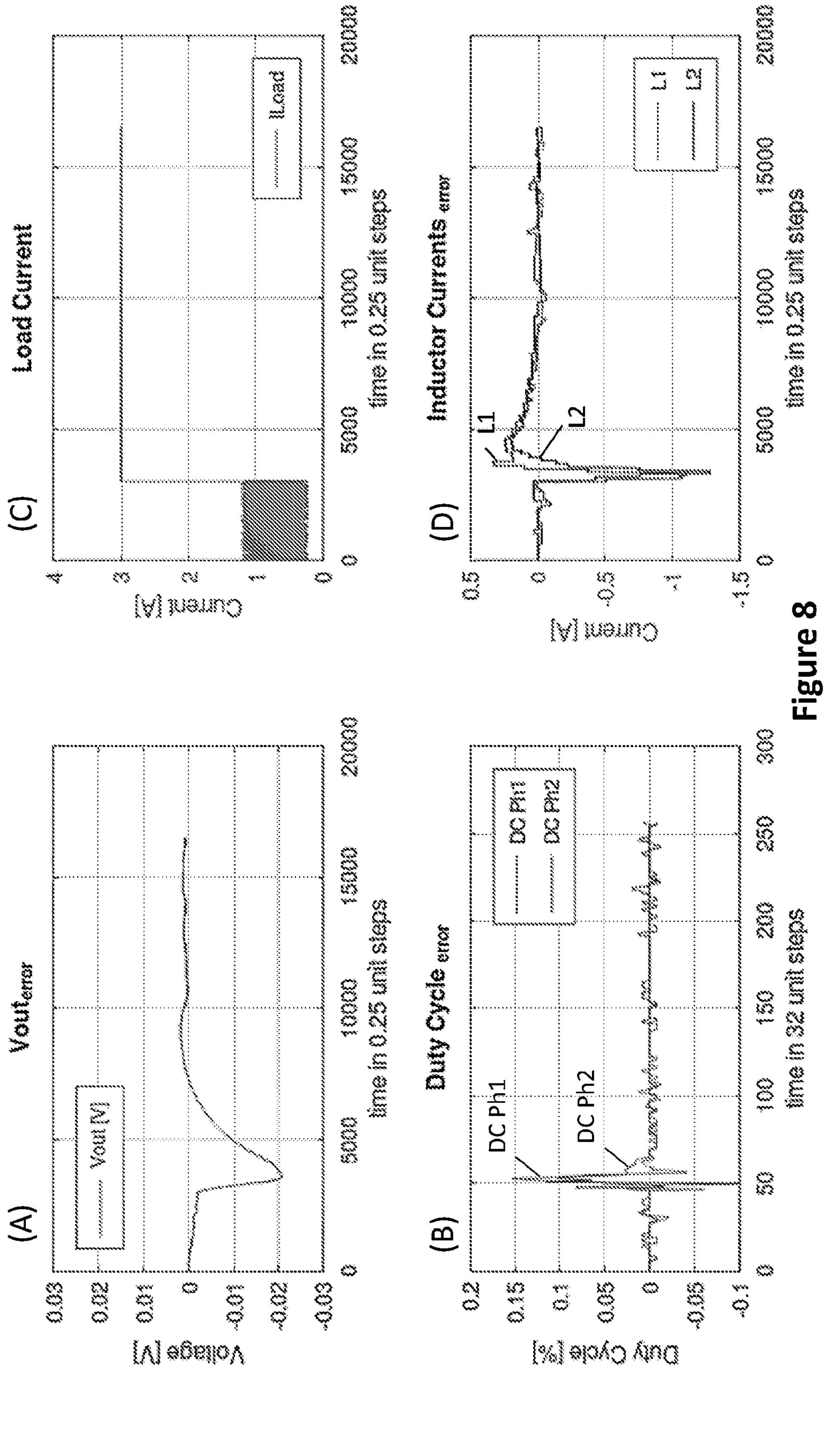
FIG. 8 is a simulation showing the output voltage error (A), the duty cycle error (B), the load current (C) and the inductor current error (C) of the DC-DC switching regulator of FIG. 7.

FIG. 8 is a simulation showing the output voltage error (A), the duty cycle error (B), the load current (C) and the inductor current error (C) of the DC-DC switching regulator of FIG. 7. The error functions are generated by comparing the real response with the ideal response. The output voltage error is obtained by subtracting the ideal output voltage Vout of FIG. 6 from the real output voltage Vout of FIG. 7. Similarly the duty cycle error is obtained by subtracting the ideal duty cycle of FIG. 6 from the real duty cycle of FIG. 7, and the inductor current error is obtained by subtracting the ideal inductor current of FIG. 6 from the real inductor current of FIG. 7. The duty cycle error function is used together with other input parameters for training the neural network of the second controller (supplementary AI controller).

FIG. 9A illustrates the output voltage Vout obtained when using the supplementary control signal SCObar. The adder 130 receives the primary control signal Scont from the first controller 110 and the supplementary control signal SCObar from the second controller 120 and generates a combined control signal Ybar. In this case Ybar is the duty cycle of switching regulator. The output voltage Vout generated by the switching regulator is close to the ideal response of FIG. 6A.

FIG. 9B illustrates the supplementary control signal SCObar generated by the second (AI) controller after training the AI algorithm. Results are obtained for a controller having a response as shown in FIGS. 7 and 8. In this example, the supplementary AI output is triggered twice (positive pulse T1 and negative pulse T2). It can be observed that this is sufficient to compensate the error of the controller.

FIG. 9D illustrates the inductor currents obtained when using the supplementary control signal.

Figure 9:
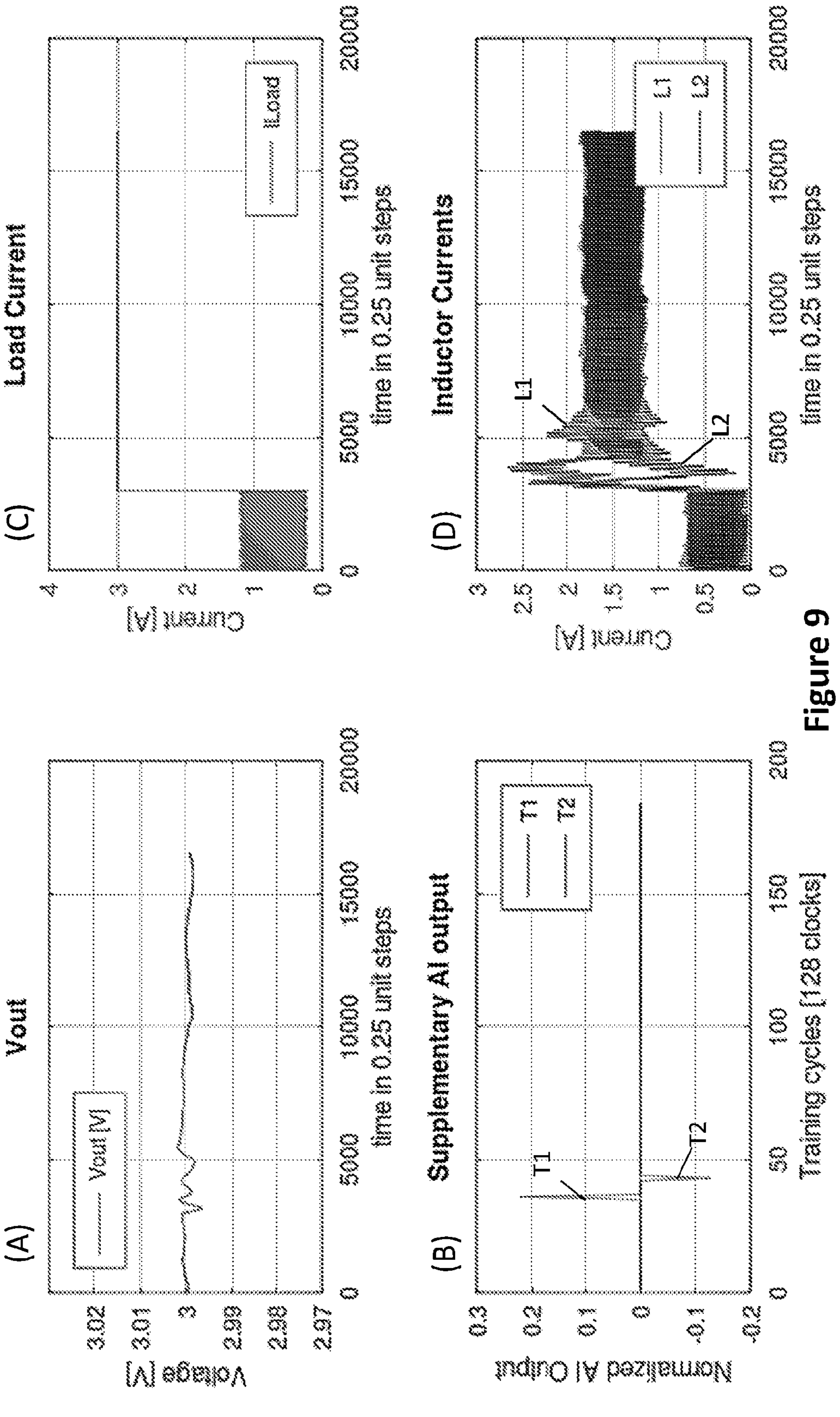
FIG. 9A is a simulation showing the output voltage Vout obtained when using the supplementary control signal.
FIG. 9B is a simulation showing the supplementary control signal generated by the second (AI) controller.
FIG. 9C is a simulation of the load current.
FIG. 9D is a simulation of the inductor currents obtained when using the supplementary control signal.
FIG. 9E is a plot showing the combined control signal.
Figure 9E:
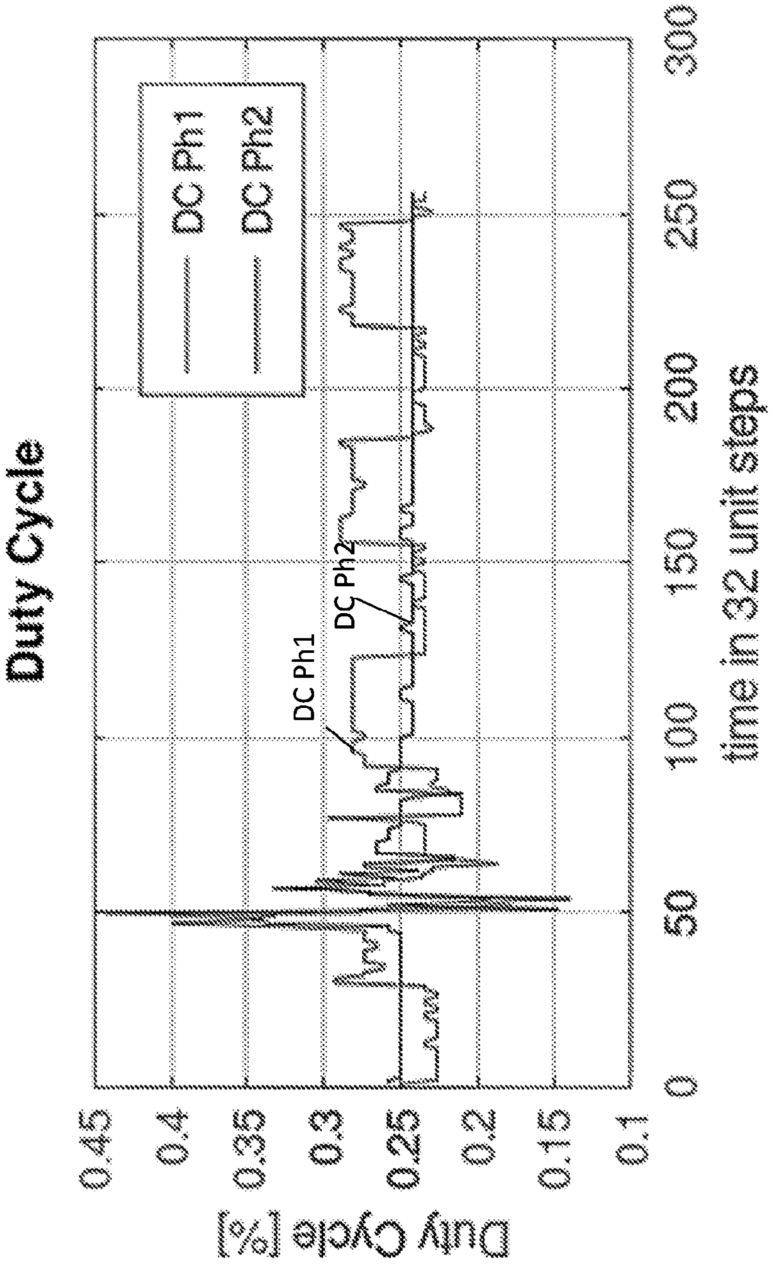

FIG. 9E shows the combined control signal Ybar corresponding to the combination of the output of the controller (duty cycle of FIG. 7B) with the supplementary AI output (FIG. 9B).

Figure 10:
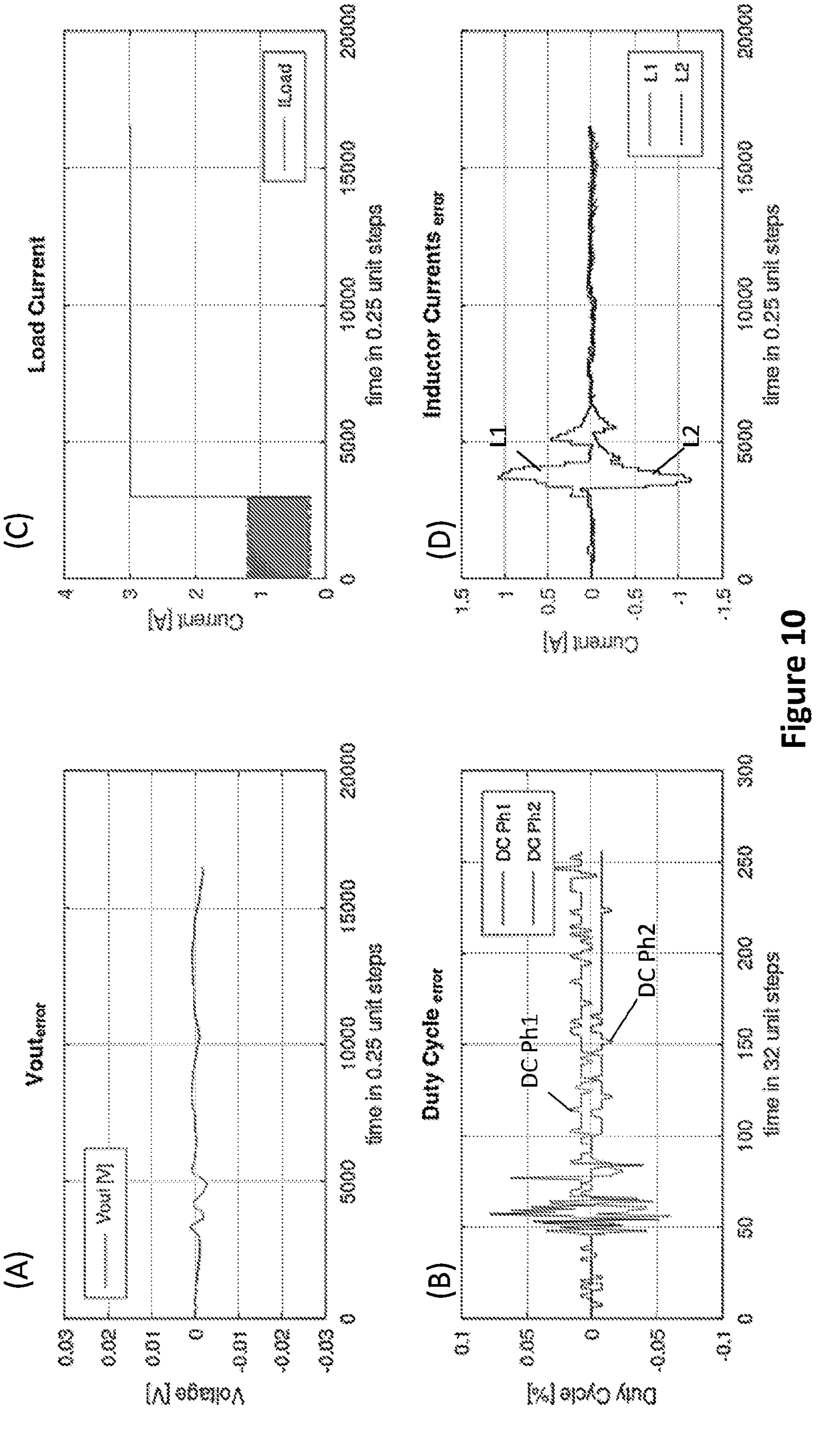
FIG. 10 is a plot showing the error functions (A) for the output voltage, (B) the duty cycle, (D) the inductor currents of the combined controller and supplementary AI response from FIG. 9 when compared with the ideal response of FIG. 6.

FIG. 10 shows the error functions of the combined controller and supplementary AI response from FIG. 9 when compared with the ideal response of FIG. 6. FIG. 10A illustrates the output voltage error, FIG. 10B illustrates the duty cycle error, and FIG. 10D illustrates the inductor current error. The threshold for training data may be chosen to eliminate the data associated with small duty cycle error and is related to digitization and measurement error (or it is already within the controllability of the main controller transfer function).

Figure 11:
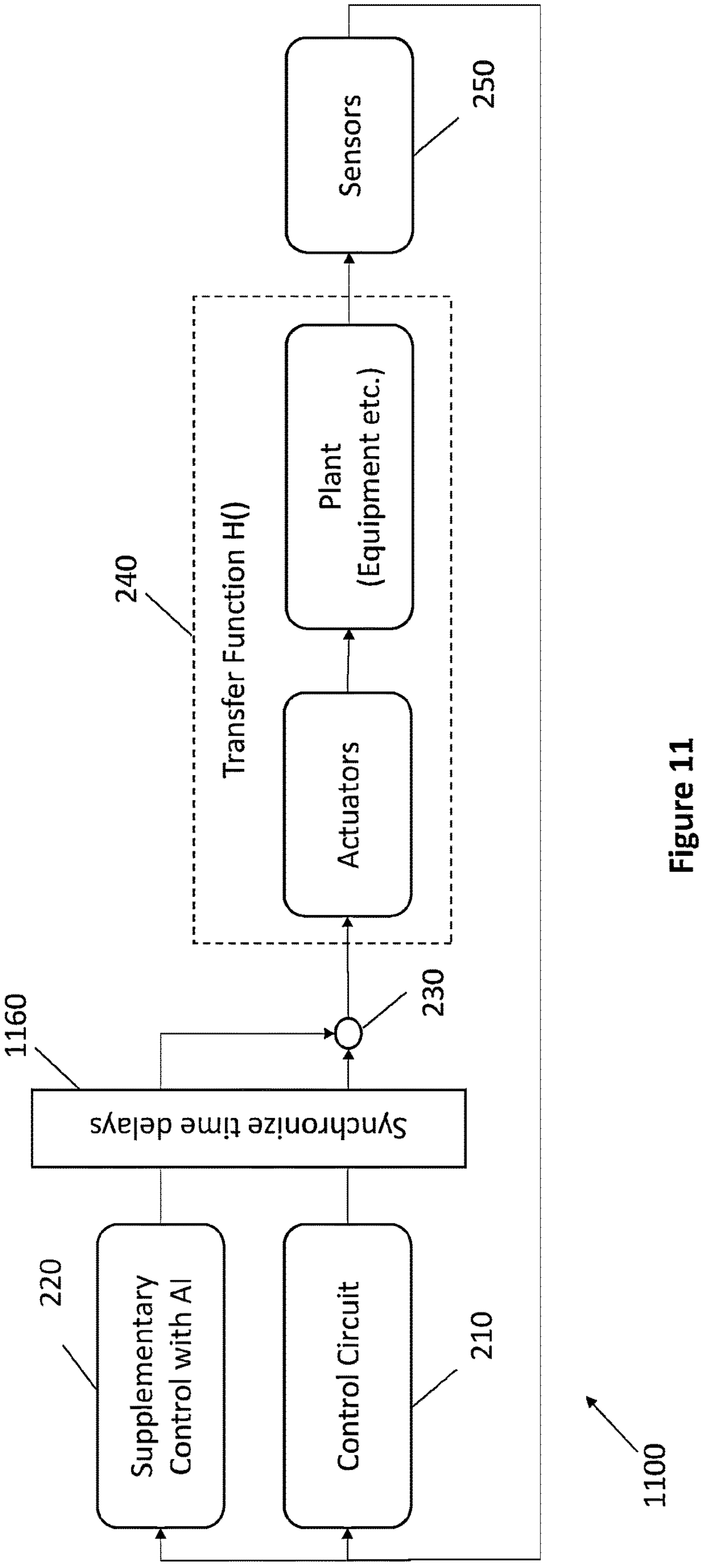
FIG. 11 is a diagram of a system for operating an electronic device, provided with a synchronization circuit.

FIG. 11 is a diagram of a system for operating an electronic device, provided with a synchronization circuit. The circuit 1100 of FIG. 11 shares similar components to those illustrated in the circuits of FIGS. 2, 3 and 5. The same reference numerals have been used to represent corresponding components and their description will not be repeated for sake of brevity. The circuit 1100 includes a synchronization circuit 1160 configured to synchronize the output of the second controller 220 (supplementary AI controller) with the output of the first controller 210.

In some cases, the input of the supplementary AI controller 220 might extend to multiple clock cycles or the neural network itself might have recursive nodes. The output of the supplementary AI controller 220 can also have a digital to analog converter, in which case the time delay would need to be adaptive and include self-calibration for the process corner and operating environmental parameter variations (temperature etc.).

Figure 12:
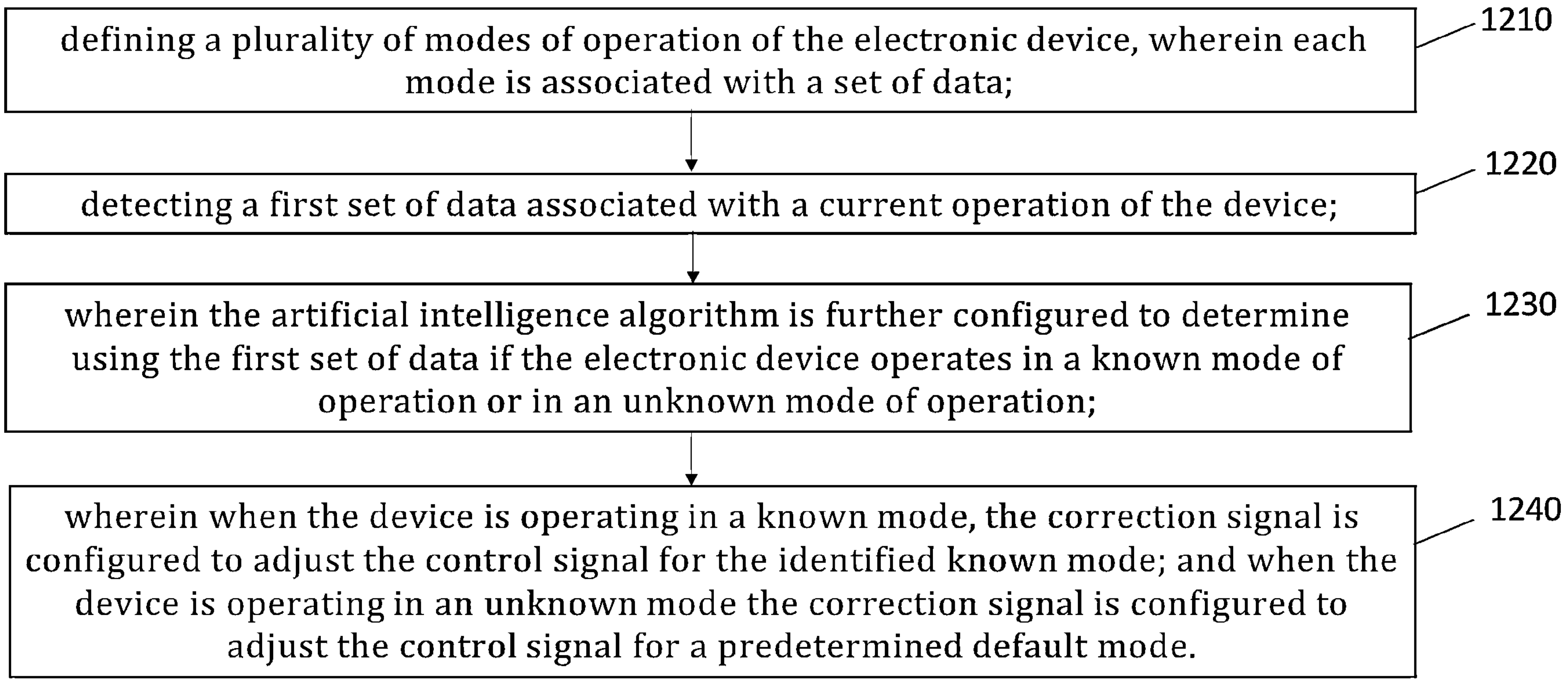
FIG. 12 is a flow chart of another method for operating an electronic device according to the disclosure.

FIG. 12 is a flow chart of another method for operating an electronic device according to the disclosure. The method extends from the method presented in FIG. 1 using the following additional steps.

At step 1210 a plurality of modes of operation of the electronic device are defined. Each mode is associated with a set of data.

At step 1220 a first set of data associated with a current operation of the device is detected.

At step 1230 the artificial intelligence algorithm determines using the first set of data if the electronic device operates in a known mode of operation or in an unknown mode of operation.

At step 1240 when the device is operating in a known mode, the correction signal is configured to adjust the control signal for the identified known mode; and when the device is operating in an unknown mode the correction signal is configured to adjust the control signal for a predetermined default mode.

Figure 13:
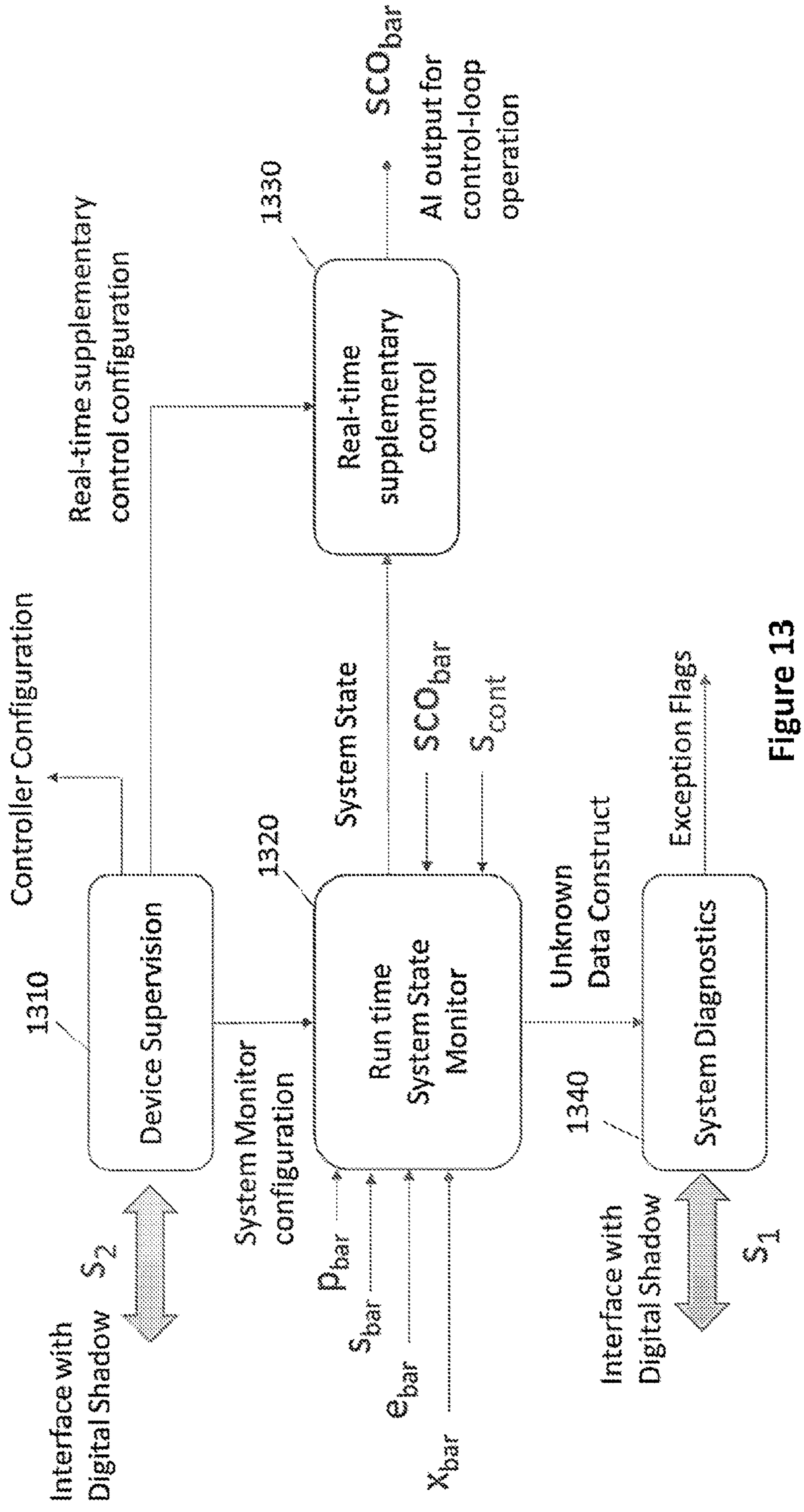
FIG. 13 is a diagram illustrating different processes that may be performed within an AI controller.
Figure 14:
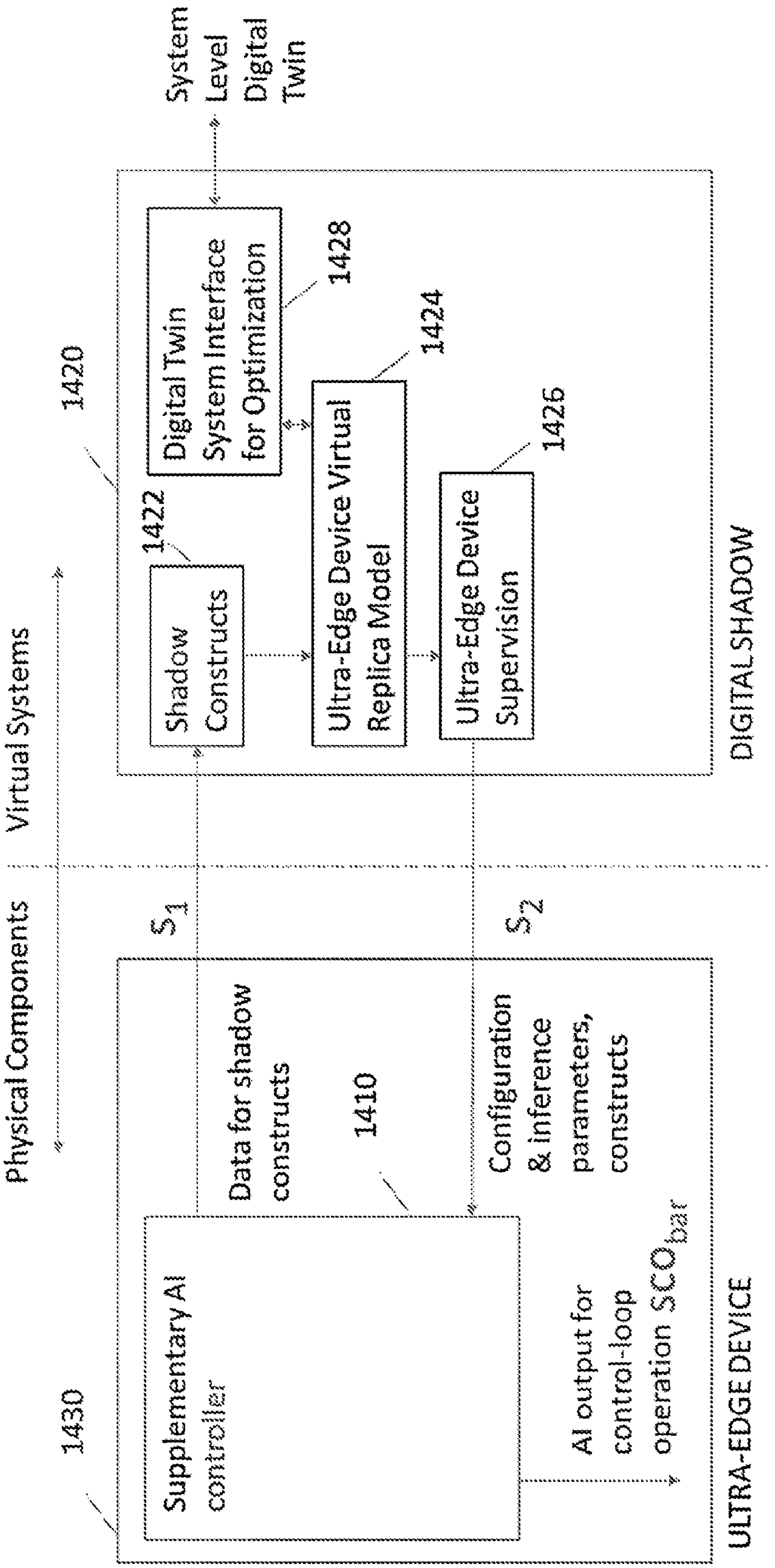
FIG. 14 is a diagram of a system for operating an electronic device according to the method of FIG. 12.

FIGS. 13 and 14 illustrate a system for implementing the method of FIG. 12.

FIG. 13 is a diagram illustrating different processes that may be performed within the supplementary AI controller 220. The supplementary AI controller 220 may be configured to implement different functionalities including device supervision, run-time system state monitoring, and real-time supplementary control.

The supplementary AI controller 220 has several modules including a device supervision module 1310, a runtime system state monitor 1320, a real-time supplementary control module 1330 and a system diagnostics module 1340. Each module may be implemented as a software engine configured to perform a specific task.

The supplementary AI controller has a first port for providing a signal S1, a second port for receiving a signal S2 and a third port for providing the supplementary control signal SCObar. The signal S1 includes data for the shadow constructs. The signal S2 includes configuration and inference parameters that need to be updated based on system level optimization and product lifecycle management considerations. The supplementary control signal SCObar has been defined above with reference to FIG. 2.

The device supervision module 1310 is configured to determine the optimum configuration for the supplementary AI controller 220 as well as the optimum configuration for the main controller 210. The optimum configuration might be defined by a particular application or type of device. The controller 210 and the supplementary AI controller 220 are configurable to operate in different modes even with a given set of input parameters. An example for a power regulator is a standby mode which is more efficient but with slower response time to deliver maximum current versus faster response time to deliver maximum current which is less efficient at low currents. Another example is changing the configuration as the device ages and approach the end of the product lifecycle. Based on the system requirements, it might be preferable to extend the lifetime of the device and restrict the maximum current that can be delivered.

The device supervision module 1310 also determines i) the number of neural networks that need to be deployed for performing real-time data monitoring and ii) the weights and biases for each of these neural networks.

In the embodiment of FIG. 13, the device supervision module 1310 provides a signal for setting or adjusting the controller configuration, a real-time supplementary control configuration signal for module 1330, and a system monitor configuration signal for module 1320. The system monitor configuration signal includes the signal S2. The real-time supplementary control signal is configured to improve the controller's response.

The optimum controller configuration of both 210 and 220 is typically determined by system level simulations performed with a digital twin using the digital shadow. The AI training may be performed on the cloud servers and the inference parameters transferred to the device supervision module on the device. The optimum configuration may be determined based on high level system constraints. In one embodiment, this system level optimization is running digital twin simulations of the entire system and determines how a specific device should perform. The device may be the physical device 1430 or its virtual replica 1420. One can run various "what if" scenarios with the digital shadow 1420 within the system level digital twin and determine the optimum outcome for the overall system when the device performs in a certain manner. The desired device performance can then be translated to corresponding configuration, parameter and data constructs and transmitted to the physical device (S2).

The run time system state monitor 1320 is configured to determine the operating environment and the electronic device parameters, and to confirm that all data and parameters are consistent with a current system state (current mode of operation of the electronic device). This system state/mode of operation is used to determine the optimum configuration for the real-time supplementary control 1330. The run time system state monitor 1320 receives the parameters Pbar, Sbar, ebar and Xbar, as well as the supplementary control output SCObar and the primary control signal Scont, and determines the system state and corresponding configuration parameters for the real-time supplementary control 1330.

If the data or parameters received are inconsistent with current or anticipated system states (known modes of operation of the electronic device), the run time system state monitor 1320 captures this information as unknown state (unknown mode of operation) and sends it to a digital shadow. In this instance a default system state would be used for allowing the real-time supplementary control 1330 to keep operating. The default system state provides a safe mode which works in almost all cases or turns off the supplementary AI output as needed.

The system state, also referred to as mode of operation, may be defined by a construct. The construct also referred to as data construct may have a multidimensional vector format that is constructed based on a set of data that may include input parameters (such as process, device, and operating environment parameters Pbar, Sbar, ebar among others), real-time control-data, and output of the controller and supplementary controller blocks for the relevant time-period.

A machine learning technique such as multidimensional reduction or principal component analysis can be performed to determine the system state corresponding to the current device operation among all known states for the run-time system state monitor 1320. When the system state monitor 1320 is unable to classify the system state corresponding to the current device operation into one of the known states, the input data and the system state data are captured and provided to the system diagnostics module 1340. The system diagnostics module then generates exception flags as necessary and provides the unknown data construct S1 to the digital shadow running on cloud servers for analysis. The data S1 would also have the relevant time synchronization for the digital shadow to reconstruct the accurate representation of the device condition that generated this unknown system state.

The exception flags can be related to the failure modes such as failure to reach target values with combined output of the supplementary control and controller. An exception flag can also be generated if a supplementary control output SCObar is repeated too frequently. For example the pattern of the SCObar might be beyond a reasonable system variations. This might be caused by malicious attack coming from a compromised digital shadow interface.

The real-time supplementary control module 1330 is configured to determine the output of the supplementary AI controller 220 for control-loop operation. This is shown as the function $f1_{error}$ in FIG. 2. The real-time supplementary control module 1330 may be implemented as an inference engine having a neural network for generating SCObar.

A neural network is implemented in either the runtime system monitor 1320 or in the a real-time supplementary control module 1330. If it is within 1330 the output is part of the control loop. If it is within 1320 the output is one of the following: i) configuration parameters for 1330 based on system state, or ii) data construct updates for the interface with digital shadow. Alternatively the neural network may be implemented in both modules 1320 and 1330.

FIG. 14 is a diagram of a system for operating an electronic device according to the method of FIG. 12.

The system 1400 is an extension of the system 200 of FIG. 2, in which the supplementary AI controller 1410 is coupled to an external processing system referred to as a digital shadow 1420. For instance the digital shadow may be a processing system provided on the cloud.

The supplementary AI controller 1410 may be integrated as a part of a device 1430, also referred to as ultra-edge device. The ultra-edge device 1410 can be implemented in various ways depending on the application. For instance if the supplementary AI controller is used to control a switched mode power converter, the device 1410 would include a primary controller for controlling the power converter and the supplementary AI controller. The ultra-edge device could also be a sensor. In this case the proposed methodology could be applied to the analog front end circuit with closed-loop or self-calibration function of the sensor during start-up. The system states can be determined during start-up and self-calibration. The analog front end closed loop circuit or the self-calibration function can be separated to various components as controller, plant, sensor similar to components of FIG. 2.

The supplementary AI controller 1410 may be implemented as the supplementary AI controller of FIG. 13.

The digital shadow 1420 has a first port for receiving the signal S1 from the supplementary AI controller 1410, a second port for providing the signal S2 to the supplementary AI controller, and a third port for communicating with a digital twin.

The digital shadow 1420 has a shadow constructs module 1422, an ultra-edge device virtual replica model 1424, an ultra-edge device supervision module 1426 and a digital twin interface 1428. Each module may be implemented as a software engine.

The shadow constructs module 1422 is configured to classify a plurality of device parameters into a specific mode of operation of the device, also referred to as state or regime of operation. The shadow constructs module 1422 may implement a clustering algorithm (like k-means), affinity propagation, supervised techniques and/or simply labelling techniques. In operation the module 1422 generates constructs and apply clustering algorithms as required. For instance the device parameters may include device configuration parameters, process variation parameters, test data and other parameters that reflect the operation of the device. Examples of modes/regimes of operation would vary depending on the device and its specific use and could include a light load mode, a heavy load mode, an overdrive mode, a failure mode etc . . . . Each mode of operation may be represented by a construct such as a multidimensional vector in a multidimensional vector space. The shadow constructs module 1422 stores a list modes/states of operation.

The shadow constructs module 1422 is also configured to receive data associated with new or unknown modes of operation, hence new constructs, identified by the supplementary AI controller 1410. These new modes/states are then analysed by the shadow constructs module 1422 and either added to the existing list of modes or disregarded. For instance if a new construct cannot be classified by the shadow construct model 1422, the new mode may be ignored.

The virtual replica model 1424 includes a set of operating modes and a functional model of the electronic device. The set of operating modes may be selected from the list of modes stored in the shadow constructs module 1422 and updated over time. The virtual replica model 1424 runs iteratively and may return two types of outputs referred to as no-change signal or change signal. The first output referred to as no-change signal indicates that the device is operating as expected and that no change is required. The second output, referred to as change signal, indicates that the device is not operating as expected or as desired and that a change in the operation of the device needs to be implemented. The Functional model includes models for the AI algorithm as well as for the controller.

The ultra-edge device supervision module 1426 receives the output signal from the virtual replica model 1424. If the output signal is the change signal, then the device supervision module 1426 retrieves the device parameters corresponding to the desired mode of operation (desired construct) from the virtual replica model 1424 and send them (signal S2) to the supplementary AI controller 1410.

The AI controller then generates the signal SCObar based on the signal S2 and other inputs to operate the electronic device in the desired mode. The AI controller may also find a new mode of operation and sends the set of data corresponding to the new mode of operation (Signal S1) to the shadow construct 1422.

Therefore the AI controller 1410 has two outputs: the supplementary control signal SCObar for adjusting the control signal operation the device and the signal S1 for changing the state or mode of operation of the device.

The digital shadow 1420 has an interface 1428 for communicating with a digital twin of the system that contains the electronic device. The digital twin may be used during the design phase of the electronic device for optimizing the device. It can also be used after deployment for system integration and optimization. The digital twin may provide a set of modes for operating the electronic device for a specific application. The virtual replica model 1424 is maintained as an accurate representation of the electronic device and its operating conditions by receiving updates from the module 1422. The virtual replica model also receives the requirements (for instance model updates) from the digital twin interface module 1428 based on system level optimization.

It will be appreciated that the system of FIG. 14 may be modified in different ways. For instance the shadow constructs module 1422, the virtual replica model 1424 and the supervision module 1426 may be duplicated as physical components either inside the ultra-edge device or as another external to the ultra-edge device, to create a self-consistent localized version without the cloud server. For example a power module in a smart appliance may include a processor running the modules 1422, 1424, 1426 to maintain optimum smart appliance operation without any interaction with cloud servers.

Therefore the digital shadow 1420 may be executed by a processor within the physical device (without interface to a system level digital twin). Such a device could also be connected to the cloud servers running another digital shadow. One can choose to operate with multiple digital shadows such that a duplicate within the physical device is used when there is no connectivity to the digital shadow running on the cloud servers.

Figure 15A:
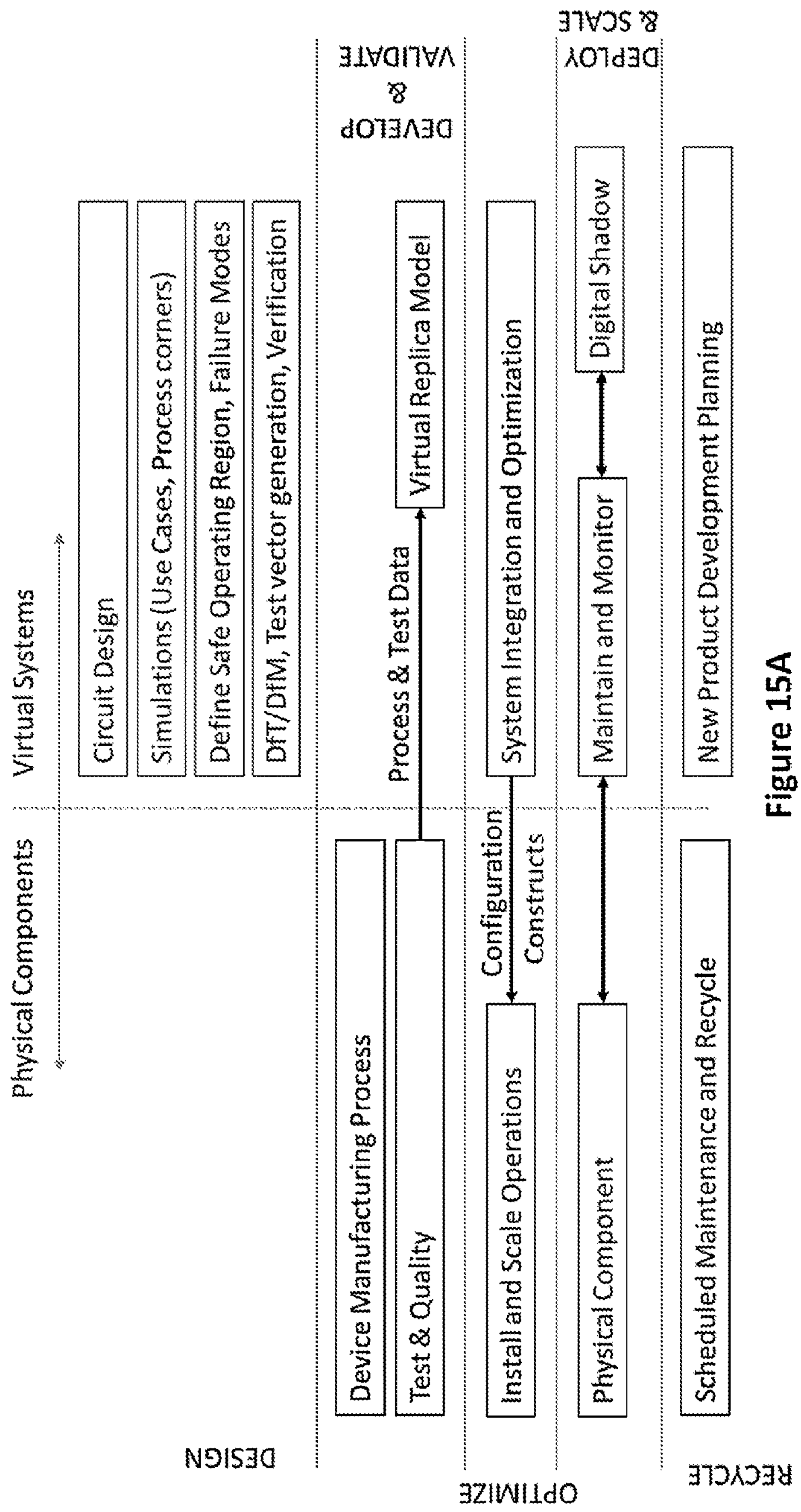
FIG. 15A is a diagram illustrating the lifecycle of the ultra-edge device and digital shadow of FIG. 14.

FIG. 15A is a diagram illustrating the lifecycle of the ultra-edge device and digital shadow of FIG. 14.

The ultra-edge device may be designed together with its digital shadow following several phases referred to as design phase, optimization phase and recycle phase. The digital shadow contains a software model of the device system transfer function as well as data constructs that represent different use case scenarios, the information regarding the current phase of product lifecycle, process and test information for the specific ultra-edge device. Devices or products are manufactured as physical components together with a corresponding digital shadow that contains all the information required to use the devices/products within the target application. The digital shadow contains a virtual replica model of the device/product, multi-dimensional vector constructs for artificial intelligence processing, supervision block for managing all configuration and inference settings of the product, and system interface for integration and optimization within a larger system.

In the design phase the data constructs are created for all possible use case scenarios, all process corners, extreme operating conditions that define the entire possible conditions including failure mechanisms where these conditions are beyond the allowable range. They are classified and grouped into identifiable subsets where the relevant subset can be used for the operation of the device together with the configuration parameters. The configuration of a device during device testing that reflects the process corners is already used in the industry. In this disclosure, the entire operating space can be created with multi-dimensional vectors including the boundaries of the safe operating region. The clusters are defined within this operating space with supervised learning and optimum device configuration for these clusters are determined. The remaining operating space (that is not part of the already defined clusters) is analysed with various techniques including Monte Carlo simulations in the following manner. When the simulation conditions are outside the boundaries of the already defined clusters, the device configuration of the nearest cluster (already defined by supervised learning) is compared with other possible device configurations (obtained by methods typically used for design optimization) and if an alternative device configuration is better for this specific operating point then this is defined as a new cluster and labelled accordingly. Note that this second step for filling in the operating space can be performed as supervised learning as well as unsupervised learning. Any area that is not already covered with Monte Carlo analysis is then covered systematically, using the average distance between existing clusters for each dimension of the multi-dimensional vector of the operating space. The resulting device configurations for the entire operating space is then analysed with methods such as principal component analysis and multi-dimension reduction techniques to obtain data constructs together with functional models that are used during deploy & scale (system integration, optimization, monitoring and maintenance) phase for the ultra-edge device and the corresponding digital shadow.

The digital shadow contains the entire parameter space created during the design phase. Process parameters are added based on the testing performed at the device level at the end of the manufacturing process as well as the device/product testing performed at qualification. The device/product reliability data including high temperature operating life (HTOL) is added to the process vector $p_{bar}$ for the digital shadow. At the deployment phase the ultra-edge device contains data constructs and configuration parameters specific to the device based on the system level optimization performed with the digital shadow. This is typically done as a subset of the digital shadow data constructs obtained by multi-dimensional reduction and principal component analysis.

FIG. 15B is a table showing a flow for setting the parameters of the ultra-edge device.

The digital shadow contains the virtual replica model of the device/product, multi-dimensional vector constructs for artificial intelligence processing, supervision block for managing all configuration and inference settings of the product, and system interface for integration and optimization within a larger system.

Physical component contains supplementary AI that use constructs and data of interest (recorded and real-time) for improving the operation of the product and capture significant data for creating relevant constructs that provide information about the operating conditions and the state of the product for accurate representation of the interaction of the product within the physical world. Some of the constructs are used within AI for the specific purpose of generating real-time data of interest and desired output for control-loop operation.

Recorded data of interest include process corners, stress conditions encountered, self-calibration parameters obtained during wake-up including component level information. It may also contain constructs that have been previously identified to be significant for the operation of the device.

Constructs can be defined during the design phase based on concepts that define a specific set of conditions that are meaningful for the designer. An example is to build the construct that reflects the product operating with mismatch sub-components, specific operating condition, and process corner of the product as manufactured.

These constructs can also be created by AI when a particular construct is identified as significantly different from all other existing constructs. In this case it might not be easily described with concepts familiar to the designer. Process corners are defined by manufacturers and provide device parameters that are at the edges of acceptable range. In semiconductor processing these refer to thickness of layers and variations in dimension of the connection that result in complementary PMOS and NMOS transistors to have different drive capabilities corresponding to different timing constraints. For instance, front end of line (FEOL)

process corners may be used. Process corners may use two-letter designators in which the first letter refers to the N-channel MOSFET and the second to the P-channel. These are typically defined as Fast, Typical, Slow for PMOS and NMOS. Processing of a device that results in FAST PMOS and FAST NMOS is referred to as FF, and so forth. Various corners are defined including typical-typical (TT), fast-fast (FF) slow-fast (SF) etc . . . .

A circuit design can be optimized to ensure that all process corners meet specific requirements. The model of the circuit designed in this manner reflects the generic approach that is applicable to all products. If a high process yield is required, the product specification can be defined by the minimum common denominator of all process corners. Other special cases, eliminate some of the process corners during testing that results in lower process yields since the corners are defined by anticipated statistical variations of the manufacturing process.

Process and test data can be used to identify the constructs that are applicable to a specific device or product with the given process corner. Since the construct is created based on the data, it does not need to fit in predefined classes (FF, TT, SS, etc.). The construct is generated for the specific process and test data. It is important to note that configuration and constructs are not generated only based on the process and test data but created during the system integration and optimization. As such, they are combination of anticipated operating conditions after integration within the target system and with the configuration and parameters already optimized for that purpose. Most of the requirements are defined by artificial intelligence methodologies and provide specific inference capabilities for the real-time operations. They do not necessarily follow conceptual definitions, but they are transparent and traceable regarding the data and methodology used to create these constructs. The constructs are maintained and updated throughout the lifetime of the product as they change based on operating conditions and remaining lifetime of the product.

Figure 16:
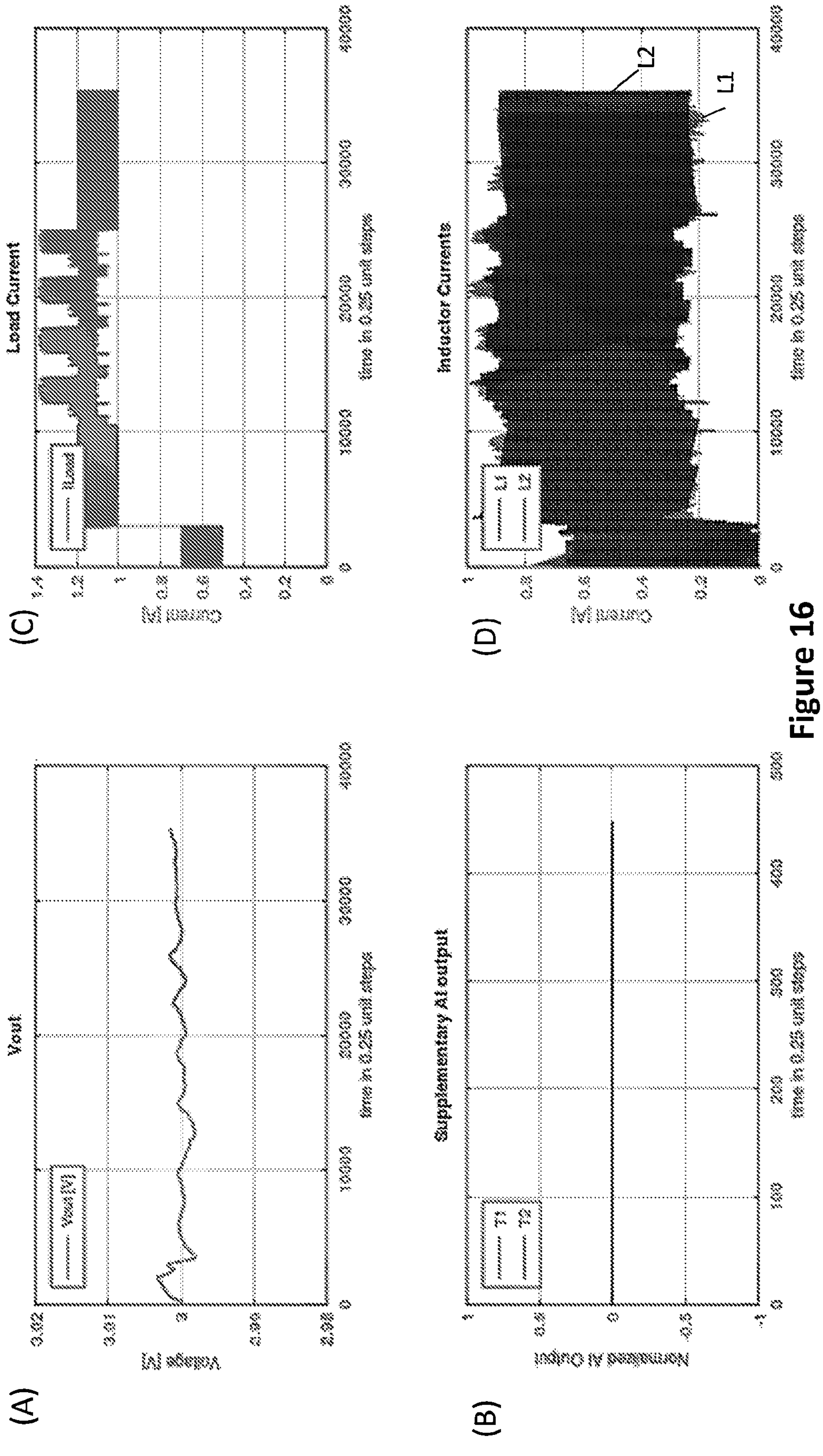
FIG. 16 is a simulation of (A) the output voltage, (B) the supplementary control signal, (C) the load current and (D) the inductor currents of a switched mode power converter for a typical load.

FIG. 16 is a simulation of (A) the output voltage, (B) the supplementary control signal, (C) the load current and (D) the inductor currents of a switched mode power converter for a typical load.

FIG. 16C shows the typical load for which the controller can respond to changes and no supplementary AI output is generated. In this simulation the main controller is able to maintain the observed system output 16A within range, hence there are no outputs from the supplementary AI as shown in FIG. 16B.

Figure 17:
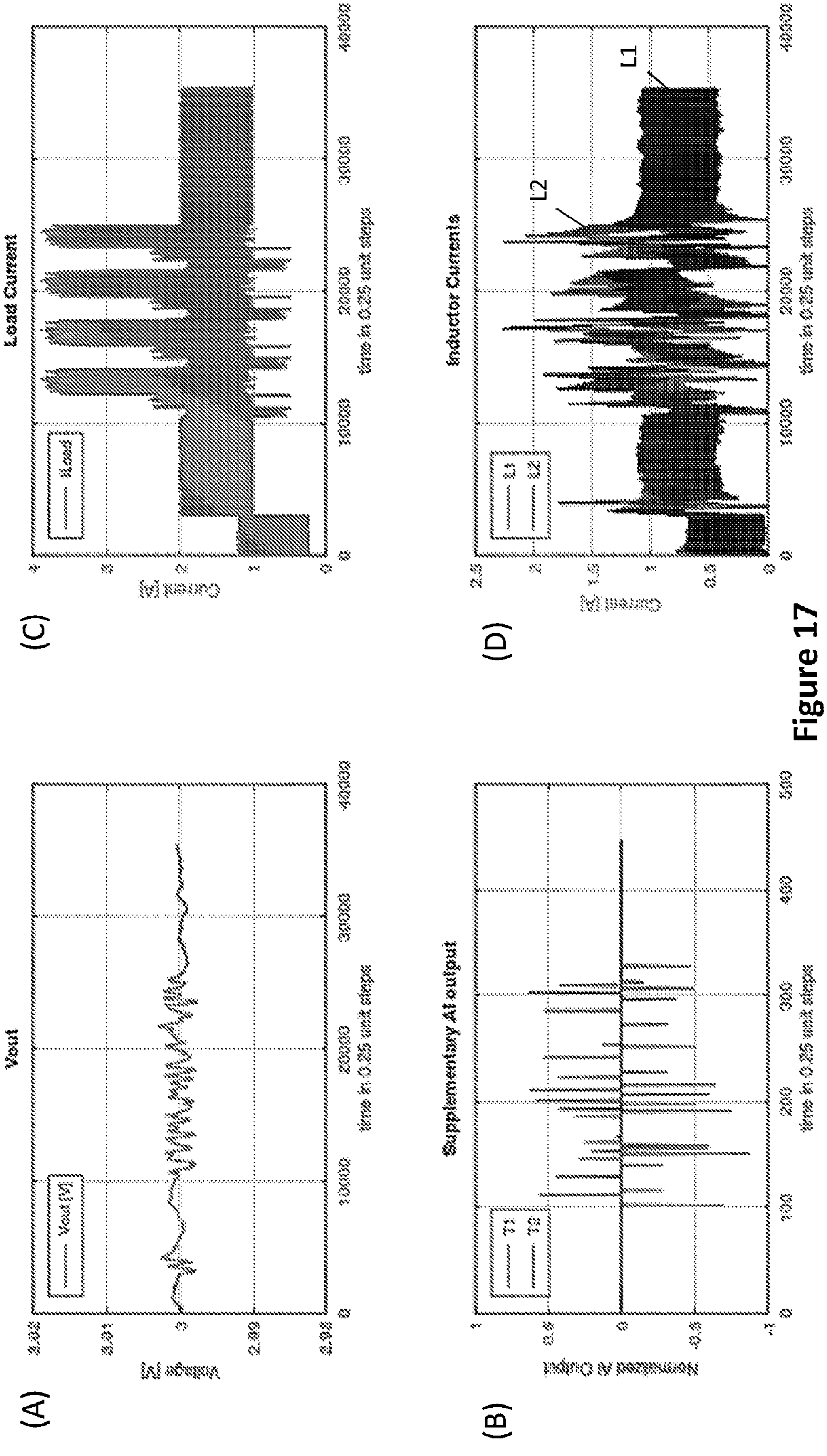
FIG. 17 is a simulation of (A) the output voltage, (B) the supplementary control signal, (C) the load current and (D) the inductor currents of a switched mode power converter operating under fast load transients.

FIG. 17 is a simulation of (A) the output voltage, (B) the supplementary control signal, (C) the load current and (D) the inductor currents of a switched mode power converter operating under fast load transients.

FIG. 17B shows the supplementary AI output generated for adjusting the control signal during the fast load transients illustrated in FIG. 17C. This information can be communicated to the digital shadow and correlation with the system level digital twin might be useful to identify the particular state of the overall system that results in this fast load transient conditions. There is no need to identify this state/mode as a new construct as the device with existing construct is able to respond to this condition and keep the desired output regulation.

The results shown in FIG. 17 are based on the construct that provides duty cycle adjustment for the large load transients that are faster than the loop bandwidth of the controller. This construct essentially provides the complimentary response based on the parameters that identify the shortcomings of the controller response function. The response may also accommodate component failure, however a better construct that can most likely be defined for component failures.

The controller of the switching regulator of a power supply typically monitors internal and external parameters for optimum regulation of the output. These can be estimation of currents in the output transistors (representative of inductor currents), input and output voltages, duty cycle anticipated based on the given input/output voltages versus the actual duty cycles. These parameters are observed over time and the differential and integral results are also monitored since the inductor and capacitor components define the time constant of the second order response of the switching regulator. The supplementary AI algorithm in these circuits may be configured to identify the principal components and variations of the data from anticipated values of the controller to further improve the regulation. For example principal component analysis could be perform by the system state monitor 1320 or the system diagnostics module 1340.

In an exemplary embodiment, measured signals and operating parameters are transformed into three vector components and used by both the main controller and supplementary AI controller . . . . The simulations presented in FIGS. 16, 17, 18 and 19 below were obtained with three vector components: i) output voltage error, ii) a transformed vector based on input voltage and output voltage, iii) a transformed vector based on output voltage and measured inductor current.

In this embodiment all vectors are reduced to 3-bit including output of transformations. The transformation is generated automatically based on statistical and machine learning techniques and provides a 3-bit output from two 3-bit input vectors. One can refer to this configuration and construct as the "Normal Operation" which responds to operating conditions as provided in the FIGS. 16, 17, 18 and 19.

Figure 18:
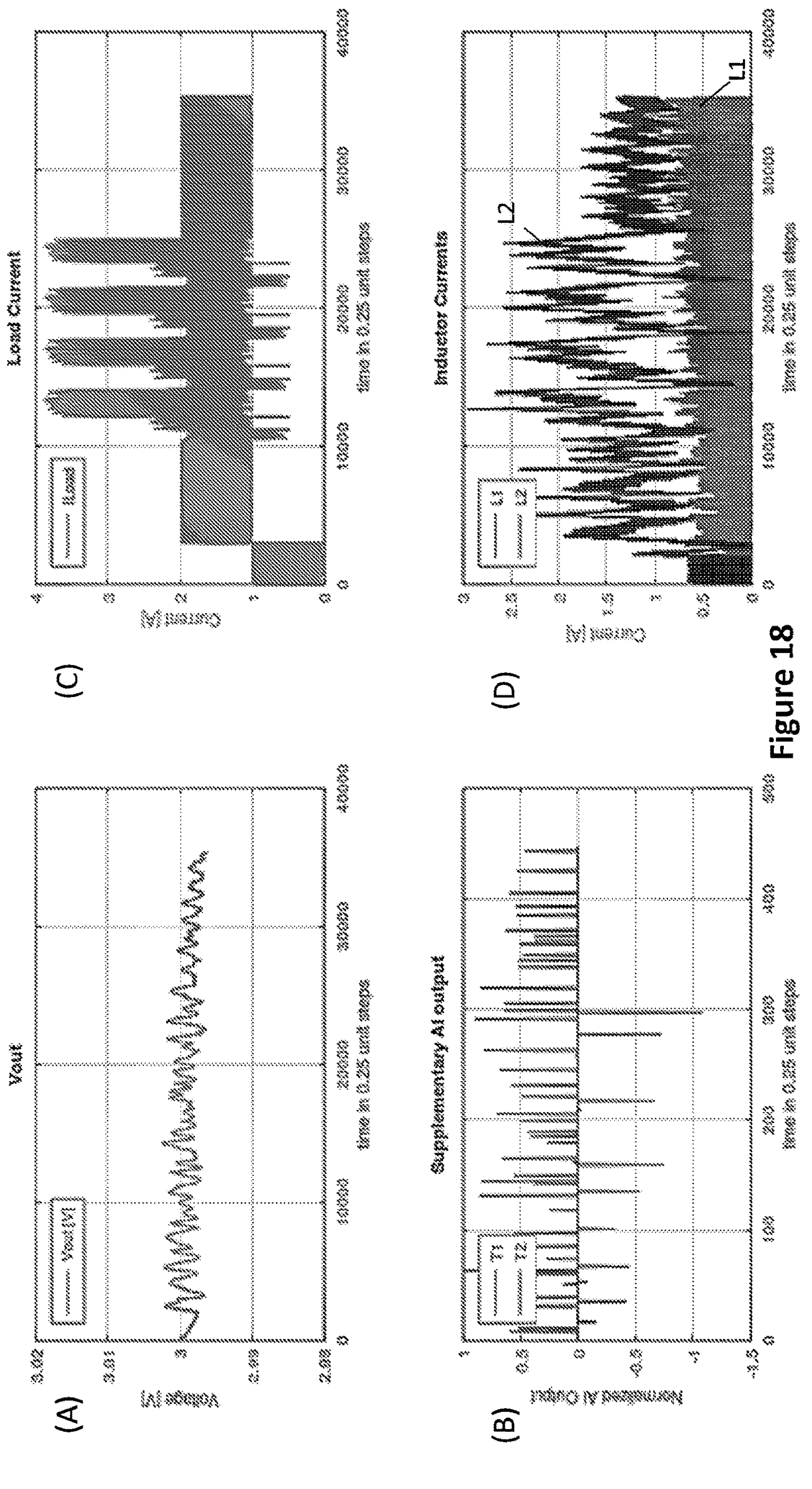
FIG. 18 is a simulation of (A) the output voltage, (B) the supplementary control signal, (C) the load current and (D) the inductor currents of a switched mode power converter operating under failed component and fast load transients.

FIG. 18 is a simulation of (A) the output voltage, (B) the supplementary control signal, (C) the load current and (D) the inductor currents of a switched mode power converter operating under failed component and fast load transient. The device is able to identify this state as a unique construct that is different from "Normal Operation". If this is already defined during designed phase, it can classify this state as a failed component state. Alternatively, the uniquely identified construct can be transmitted to digital shadow for classification.

Figure 19:
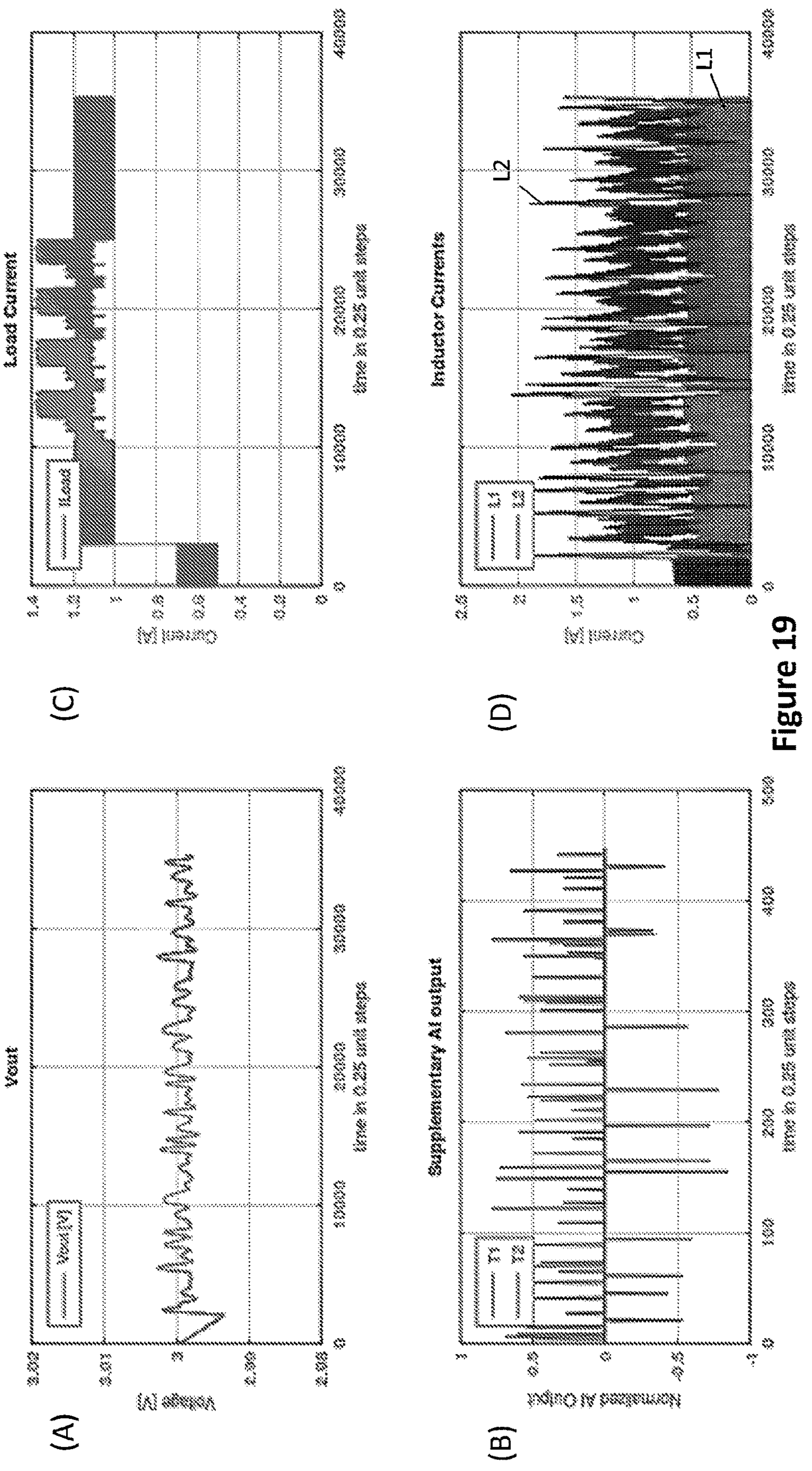
FIG. 19 is a simulation of (A) the output voltage, (B) the supplementary control signal, (C) the load current and (D) the inductor currents of a switched mode power converter operating under failed component and light load condition.

FIG. 19 is a simulation of (A) the output voltage, (B) the supplementary control signal, (C) the load current and (D) the inductor currents of a switched mode power converter operating under failed component and light load condition.

The failed component mode as shown in FIGS. 18 and 19 can be identified as a new region of operation significantly different from the so called normal mode, and requires new configurations and constructs to be uploaded to the device. If these are already defined and stored in the device, the device can make these changes without the digital shadow. Alternatively, the digital shadow can be used within the system level digital twin environment to identify a new optimum condition until the replacement is scheduled for the device. This could be turning off the faulty phase and programming the load to stay within the light load conditions appropriate for single phase operation. This could be necessary as the operation of the device in the conditions shown in FIG. 18 is likely to shorten the lifetime of the product.

The constructs can be considered as parameters of the supplementary AI to perform a desired goal within a specific context. There can be multiple constructs working in parallel, in which case the competing goals and trade-offs will need to be considered as well as the multiple contexts that are being considered in parallel.

The ultra-edge device as described in FIG. 14 may be part of a larger system. The system instructions that are controlling other elements within the system (not directly controlling the ultra-edge device) are correlated to the changes in the operating conditions of the ultra-edge device. Although these instructions are not directed to the ultra-edge device, they are nonetheless correlated with the ultra-edge device outcome. Consequently, changes can be anticipated by the ultra-edge device based on the system instructions.

For example a power regulator may interpret multiple memory access commands as an anticipated load current reduction. This is because these command will likely cause the CPU to wait, and this will be correlated to a drop in load current. Similarly, system level instructions such as turning on display or baseband transmission can be correlated to power module operating conditions and these can effectively be "interpreted" by the power module to mean "change load current according to . . . " The system instructions can be interpreted, for instance using natural language methods.

Therefore the system instructions may be to analysed to identify a correlating between a set of instructions and an event. For example the event may be the supplementary AI control signal (correction signal). In turn a behaviour of the electronic device can be predicted based on the correlation. This may include a chaotic behaviour triggered by a cyber-attack.

Figure 20:
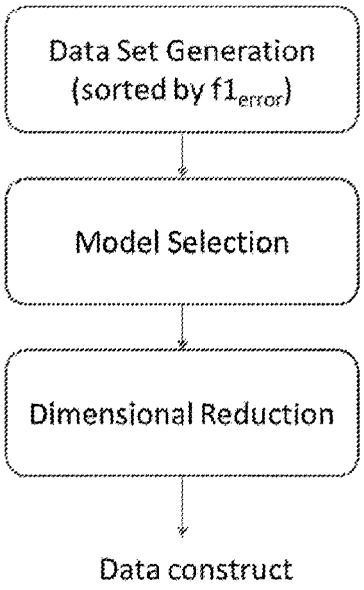
FIG. 20 is a diagram illustrating the use of system instructions by the supplementary AI controller for improving the closed-loop system response.
Figure 20:
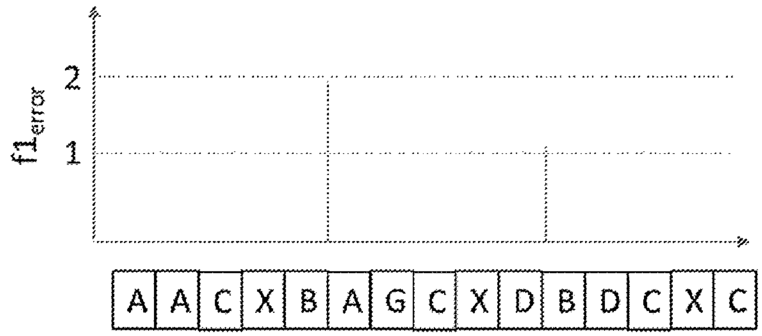

FIG. 20 is a diagram illustrating the use of system instructions by the supplementary AI controller for improving the closed-loop system response.

System instructions may include software, control commands, configurations, etc.

There are two data flows in the application of this concept to closed-loop system response: first is to identify the pairs of instruction data constructs and corresponding change in system behaviour; second is to reduce the multidimensional data constructs to identifiable cluster with principal components for efficient inferencing.

The proposed approach is similar to the conversational machine comprehension (CMC) of generating question and answer pairs from a given text. A controller response correction can be generated as an answer to the reduced dimension system instruction as the question with simulated system instruction and ideal controller response as the reference text.

The proposed approach differs significantly from CMC in that the system instruction based controller response prediction does not aim at processing the instruction set as a whole for determining the significance of instructions (or significance of relevant positions of instructions). Instead a subset is created based on corrections obtained by comparing the controller response to the ideal response. The error function obtained by this comparison is used to collect data prior to these error occurrences, sorted in descending magnitudes of the errors. The significance is derived from the magnitude of the error. The subset obtained in this manner is unique for each controller. As a result the output is in line with the actuator response required to keep the system response with minimum error (compared to the ideal response).

Several CMC method applied to Natural Language Processing including positive and negative mood identification of social media posts have been reported. The present disclosure proposes to apply these methodologies to system response errors anticipated based on the input instructions.

The input instructions may be in the form of low level CPU instructions (or microcontroller instructions). The instructions can be provided in a pipeline to be executed. These low level instructions are typically generated from software code by compilers that target specific hardware architectures. It is the final sequence of machine code instructions that are considered in the pattern conversion from instruction sequence to anticipated error of the system response.

The data flow is outlined in FIG. 20. The system instructions of specified time periods preceding the controller response corrections are captured and sorted in order of decreasing magnitude of $f1_{error}$ (from max to threshold).

This is the data set that will be used for generating system instruction embeddings, similar to the word embeddings generated in transformer language models in natural language processing. This encoded data set is then used to compare various models with different time span and relational parameters of instructions within the specified time span preceding the $f1_{error}$ function. Further dimensional reduction and principal component analysis may be applied to reduce the data to minimum representation for use with inferencing by supplementary AI control training. This is combined with other data sources including process and test parameters for further classification. An example is given in FIG. 20 showing a sample instruction set and $f1_{error}$ function.

For a model with four instruction set patterns and one instruction time delay, the training set for the system instructions can be tabulated as shown in the table of FIG. 20.

The system instructions can be analysed and correlated with a particular event to derive a system condition. For example system instructions may be correlated with the supplementary AI control signal.

A particular model is selected. For example, the model may be looking at a particular frequency of words, in which a word represents the last 4 instructions. Then it is checked if the supplementary AI control signal (F1error) is associated with a particular word. If there is a correlation between the frequency of a particular word and the supplementary AI signal, then it may be possible to predict a specific problem.

In the example of FIG. 20, the word AACX is made of instructions A, A, C and X. This word (set of instructions) corresponds to the F1error=2. Similarly the word AGCX is made of instructions A, G, C and X. This word corresponds to the F1error=1. Then several words ACXB, GCXD, correspond to F1error=0.

If over time it is identified that AACX corresponds, more often than not, to F1error=2, then a correlation can be established between a specific supplementary control signal and a specific set of instructions.

The system for operating an electronic device according to the disclosure may be used in a variety of applications. For illustration the following additional examples are provided below.

The system may be used as a controller or as part of a control system. For instance in FIG. 2 and subsequent figures, the plant may be an industrial motor such as a 3-phase induction motor. In this example the primary control signal Scont generated by the control circuit 210 may include a plurality of pulse-width modulation signals for controlling the 3-phase induction motor.

The system may also be used as an active power filter such as a shunt active power filter for providing power factor correction. For instance in FIG. 2 and subsequent figures, the plant may be an active power filter. The active power filter can be used to provide power factor correction to a power system such as an electrical energy grid that provides power to homes, businesses, infrastructures etc. In this example the active power filter minimizes the stresses and maximize the power handling capacity of the power system.

Figure 21A:
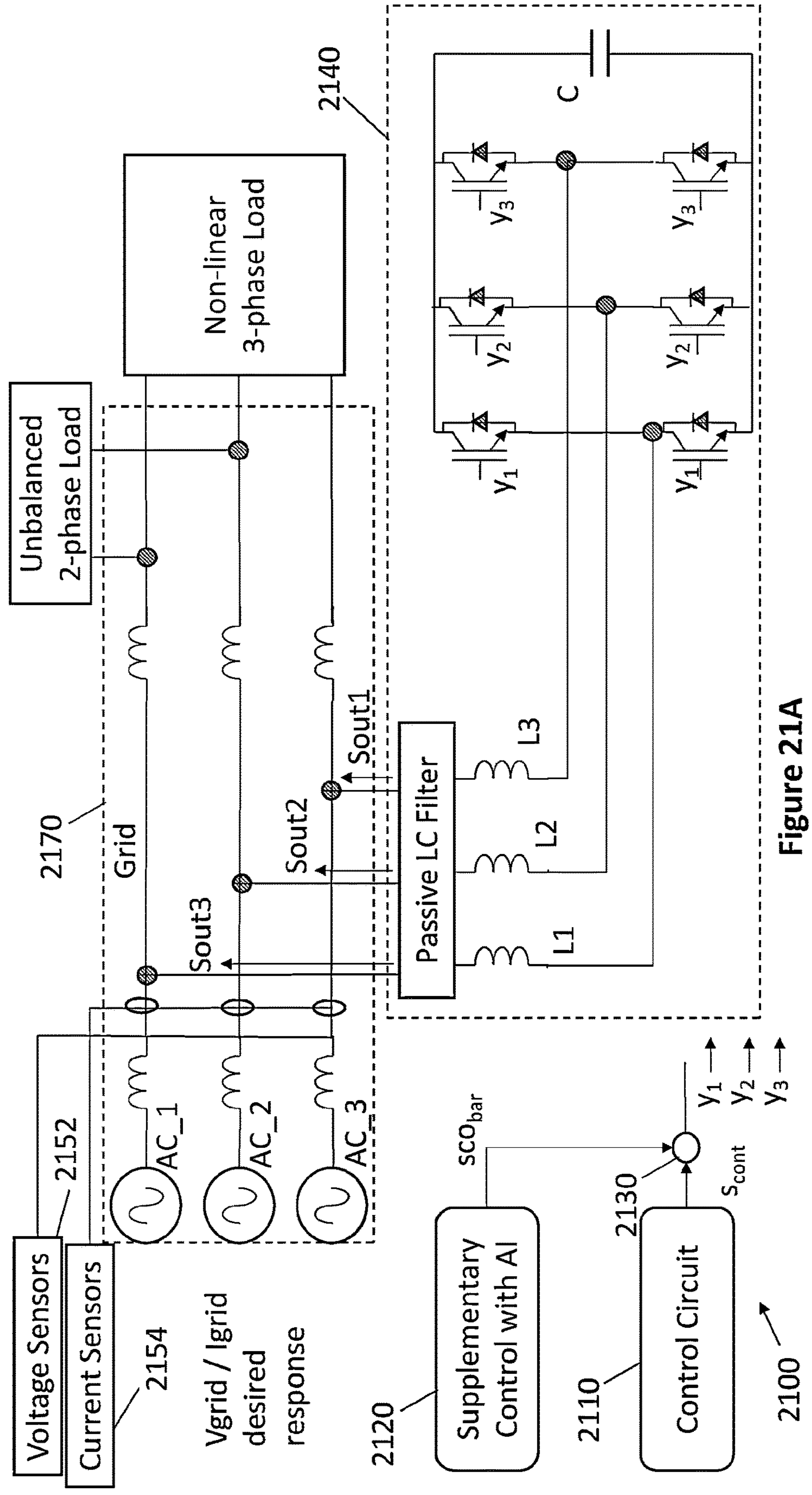
FIG. 21A is a diagram of a system for operating an active power filter coupled to an energy grid.

FIG. 21A is a diagram of a system for operating an active power filter coupled to an energy grid. The system 2100 includes a first (main) controller 2110, a second (AI) controller 2120, an adder 2130, an active power filter 2140 and voltage and current sensors 2152, 1254 coupled to the energy grid 2170. In this example the energy grid 2170 is represented as a 3-phase energy grid having three AC sources, however it will be appreciated that the energy grid may have a number N of phases. The energy grid 2170 is coupled to a non-linear three-phase load such as a motor or a factory; and a two-phase load which may create an unbalance on the grid. The active power filter 2140 includes a plurality of switches coupled to a capacitor C. In this example three pairs of switches are coupled in parallel with the capacitor C. Each pair of switches is coupled to a passive LC filter via a corresponding inductor, L1, L2 and L3, respectively.

In operation the active power filter 2140 is driven by the combined output of the primary and secondary controllers provided by the adder 2130. The active power filter controller 2110 uses data from the voltage sensors 2152 and the current sensors 2154 to generate the primary control signal Scont in the form of one or more control signals Y1, Y2, Y3 for controlling the switches of the active power filter 2140. The active power filter 2140 provides the signals Sout1, Sout2 and Sout3 to the grid 2170 to provide power factor correction and/or to eliminate harmonics in the power signals. The signals Sout1, Sout2 and Sout3 may be current signals. The supplementary control signal SCObar generated by the second (AI) controller 2120 provides correction for the Scont to correct residual error in the system and achieve the desired system response. In this example an ideal response may be obtained when the harmonics have been cancelled.

The energy grid 2170 has a plurality of AC sources, in this example three sources labelled AC_1, AC_2 and AC_3. The AC sources may be provided by a plurality of wind turbines coupled to the grid. For instance a wind turbine may be connected to the grid via 3-phase power inverter. The system of the disclosure may be used to control the inverter or inverters.

The energy grid 2170 may also be coupled to a DC source such as a photovoltaic power generator.

Figure 21B:
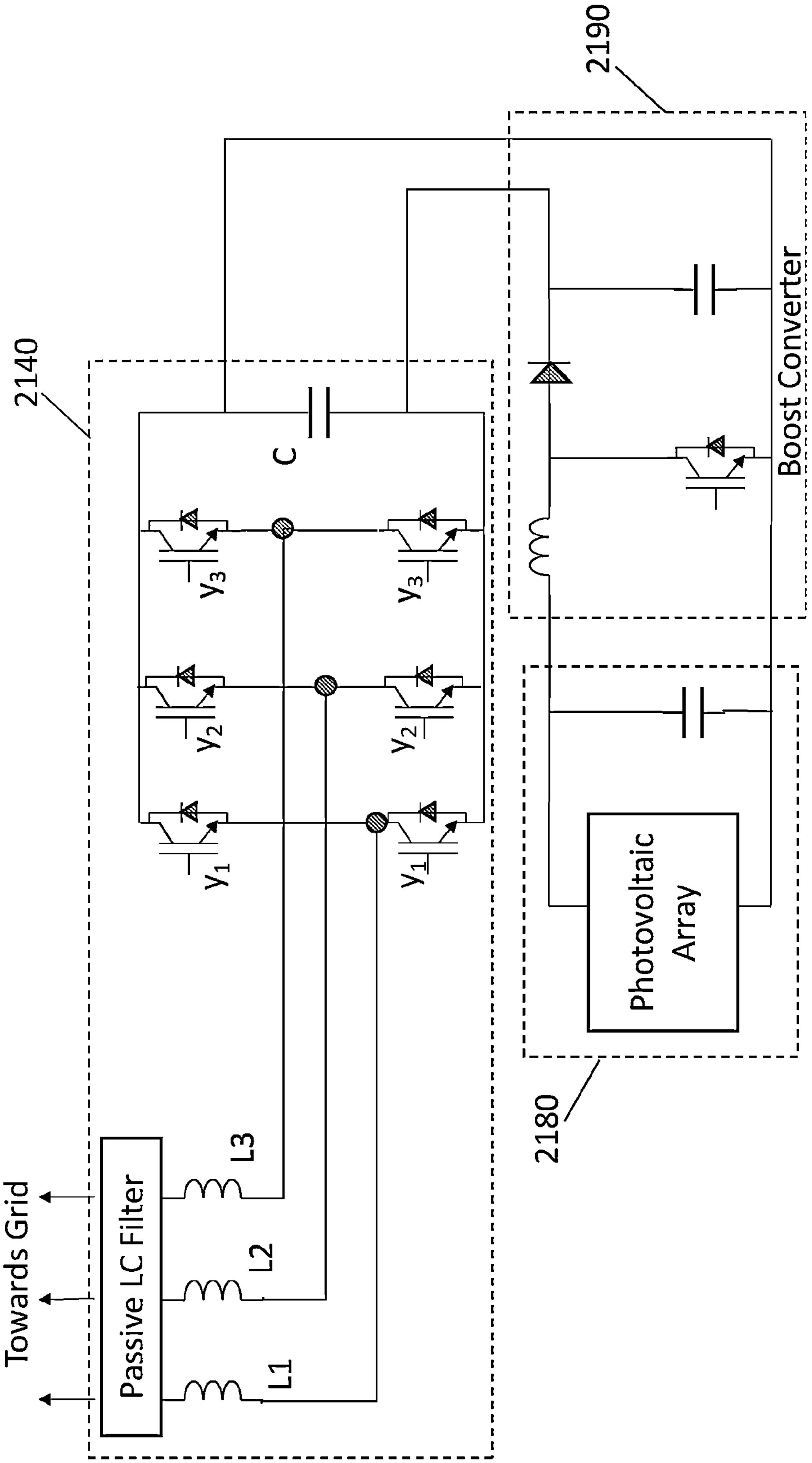
FIG. 21B is a diagram of a photovoltaic power generator coupled to the active power filter of FIG. 21A.

FIG. 21B is a diagram of a photovoltaic power generator coupled to the active power filter 2140 of FIG. 21A.

The photovoltaic power generator 2180 is coupled to the active power filter 2140 via a DC-DC boost converter 2190. The photovoltaic power generator 2180 may be used to provide additional power to the grid 2170 and/or to compensate for a drop of power generated by the AC sources, for instance the wind turbines.

It will be appreciated that the circuit 2140 may be adapted and operated to perform several functions. For instance the circuit 2140 may be used as an DC/AC converter, an inverter, an active power filter, or as a combination of the above. For example the system of the disclosure may be used to operate the circuit 2140 as an inverter in a similar fashion as described above in which the combined output of the primary and secondary controllers provides the signals Yi to the switches.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A method for operating an electronic device, the method comprising:
- generating with a controller a control signal for controlling the electronic device;
- receiving with a first processor a plurality of parameters comprising an electrical parameter of the electronic device and at least one of a process parameter, a system parameter, and an environmental parameter and
- executing with the first processor an artificial intelligence algorithm configured to generate a correction signal based on the plurality of parameters;
- combining with a combiner the control signal with the correction signal to adjust the control signal;
- wherein the first processor comprises a real-time supplementary control configured to generate the correction signal, a system diagnostics module, and a runtime system state monitor adapted to receive the plurality of parameters, the correction signal and the control signal; and
- using the runtime system state monitor, determining a current mode of operation of the electronic device and corresponding configuration parameters for the real-time supplementary control; and classifying the current mode in a known mode of operation or in an unknown mode of operation; and when the system state monitor cannot classify the current mode of operation into a known mode, sending data associated with the unknown mode to the system diagnostics module to generate exception flags.

2. The method as claimed in claim 1, comprising:
- defining a plurality of modes of operation of the electronic device, wherein each mode is associated with a set of data;
- detecting a first set of data associated with a current operation of the device; and
- wherein the artificial intelligence algorithm is further configured to determine using the first set of data if the electronic device operates in a known mode of operation or in an unknown mode of operation.

3. The method as claimed in claim 2, wherein when the device is operating in a known mode, the correction signal is configured to adjust the control signal for the identified known mode; and when the device is operating in an unknown mode the correction signal is configured to adjust the control signal for a predetermined default mode.

4. The method as claimed in claim 2, further comprising running a model of the electronic device to determine if the electronic device is operating in a target mode; and when the electronic device is not operating in the target mode sending a second set of data associated with the target mode to the artificial intelligence algorithm.

5. The method as claimed in claim 2, comprising analysing the first set of data to classify the unknown mode.

6. The method as claimed in claim 4, wherein the model comprises a functional model and a set of modes of operation among the plurality of modes of operation.

7. The method as claimed in claim 6, comprising running digital twin simulations using a digital twin of the electronic device to find an optimum configuration and mode of operation of the electronic device and to update the functional model.

8. The method as claimed in claim 4, the method comprising generating training data and training the artificial intelligence algorithm using the training data to generate the correction signal that reduces a deviation from an ideal response of the electronic device.

9. The method as claimed in claim 8, wherein the training data are generated using a transfer function of the electronic device.

10. The method as claimed in claim 1, comprising generating a construct for each mode of operation, wherein the construct comprises a multidimensional vector in a multidimensional vector space.

11. The method as claimed in claim 10, wherein the multidimensional vector space comprises an entire operating region of the electronic device and wherein a mode of operation is identified using supervised learning as one or more clusters of constructs.

12. The method as claimed in claim 11, comprising identifying a new mode of operation using unsupervised learning.

13. The method as claimed in claim 11, comprising determining a current mode of operation of the device within the entire operating region and adjusting the electronic device configuration based on the current mode of operation.

14. The method as claimed in claim 13, wherein electronic device configuration is adjusted based on the current mode of operation throughout the lifecycle of the device.

15. The method as claimed in claim 14, comprising sending the adjusted configuration to a digital twin through the lifecycle of the device to perform at least one of optimization, and predictive maintenance of the device.

16. The method as claimed in claim 1, comprising analysing the unknown mode to predict a failure of the electronic device or when the device configuration needs to be adjusted to improve performance.

17. The method as claimed in claim 1, wherein the electronic device is part of a system, the method further comprising analysing system instructions to identify a correlation between a set of instructions and an event.

18. The method as claimed in claim 17, wherein the event comprises the correction signal.

19. The method as claimed in claim 17, further comprising predicting a behaviour of the device based on the correlation.

20. A system for operating an electronic device, the system comprising:

a controller configured to generate a control signal for controlling the electronic device;

a first processor adapted to receive a plurality of parameters comprising an electrical parameter of the electronic device and at least one of a process parameter, a system parameter, and an environmental parameter and to execute an artificial intelligence algorithm configured to generate a correction signal based on the plurality of parameters;

a combiner adapted to combine the control signal with the correction signal to adjust the control signal;

wherein the first processor comprises a real-time supplementary control configured to generate the correction signal, a system diagnostics module, and a runtime system state monitor adapted to receive the plurality of parameters, the correction signal and the control signal; the runtime system state monitor being configured to determine a current mode of operation of the electronic device and corresponding configuration parameters for the real-time supplementary control; and to classify the current mode in a known mode of operation or in an unknown mode of operation; and wherein when the system state monitor cannot classify the current mode of operation into a known mode, the system state monitor sends data associated with the unknown mode to the system diagnostics module to generate exception flags.

21. The system as claimed in claim 20, comprising:

a second processor configured to:

define a plurality of modes of operation of the electronic device, wherein each mode is associated with a set of data; and detect a first set of data associated with a current operation of the device; and wherein the artificial intelligence algorithm is further configured to determine using the first set of data if the electronic device operates in a known mode of operation or in an unknown mode of operation.

22. The system as claimed in claim 20, comprising the electronic device and a sensor for sensing the electrical parameter of the electronic device.

23. The system as claimed in claim 20, comprising a communication interface for communicating with a digital twin of the electronic device.

24. The system as claimed in claim 20, comprising:

a first software engine configured to define the plurality of modes of operation of the electronic device;

a second software engine configured to run a model of the electronic device to determine if the electronic device is operating in a target mode; and a third software engine configured to send a second set of data associated with the target mode to the artificial intelligence algorithm when the electronic device is not operating in the target mode.

25. The system as claimed in claim 20, comprising a synchronization circuit configured to synchronize the control signal with the correction signal.

26. The system as claimed in claim 20, wherein the electronic device comprises a switched mode power supply, or a driver for driving a motor, or an active power filter, or an inverter.

27. The system as claimed in claim 20, wherein the electronic device is part of a power system.

28. A non-transitory computer readable data carrier having stored thereon instruction which when executed by a computer cause the computer to carry out the method of claim 1.

* * * * *